(12) United States Patent
Ohta et al.

(10) Patent No.: US 7,584,668 B2
(45) Date of Patent: Sep. 8, 2009

(54) MONITORING SYSTEM FOR VALVE DEVICE

(75) Inventors: Hiroyuki Ohta, Tsuchiura (JP); Hiromi Shimazu, Kashiwa (JP); Yohei Tanno, Hitachinaka (JP); Yoshihisa Kiyotoki, Hitachinaka (JP); Kenji Onodera, Hitachi (JP); Kenji Araki, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/834,727

(22) Filed: Aug. 7, 2007

(65) Prior Publication Data
US 2008/0034882 A1   Feb. 14, 2008

(30) Foreign Application Priority Data
Aug. 9, 2006   (JP) .............................. 2006-216367

(51) Int. Cl.
   *G01B 7/16*   (2006.01)
(52) U.S. Cl. .............................. 73/777; 73/760; 73/168
(58) Field of Classification Search .................. 73/777, 73/760, 168
   See application file for complete search history.

(56) References Cited

U.S. PATENT DOCUMENTS

| | | | | |
|---|---|---|---|---|
| 5,419,199 A | * | 5/1995 | Araki | 73/708 |
| 5,563,349 A | * | 10/1996 | Burke et al. | 73/831 |
| 5,722,286 A | * | 3/1998 | Robert et al. | 73/168 |
| 5,774,048 A | * | 6/1998 | Achterholt | 340/447 |
| 6,101,870 A | * | 8/2000 | Kato et al. | 73/146.8 |
| 6,888,449 B2 | * | 5/2005 | Lin et al. | 340/442 |
| 7,281,421 B2 | * | 10/2007 | Yin et al. | 73/146.8 |

FOREIGN PATENT DOCUMENTS

| | | |
|---|---|---|
| JP | U HEI (1993)-059074 | 3/1993 |
| JP | 08-261355 | 10/1996 |
| JP | A-2001-227675 | 8/2001 |
| JP | A-2005-114441 | 4/2005 |
| JP | A-2005-338012 | 8/2005 |
| JP | A-2006-003182 | 1/2006 |

* cited by examiner

*Primary Examiner*—Max Noori
(74) *Attorney, Agent, or Firm*—Antonelli, Terry, Stout & Kraus, LLP.

(57) ABSTRACT

A monitoring system for valve device according to the present invention comprises a semiconductor single crystalline substrate including a bridged circuit and the bridged circuit comprising impurity-diffused resistors. The semiconductor single crystalline substrate is mounted to any of a valve device's valve stem, valve yoke, drive shaft, or elastic body disposed at the end of the drive shaft. Thrust and torque of the valve device are measured by the semiconductor single crystalline substrate and then the measured values are used for monitoring the valve device.

57 Claims, 20 Drawing Sheets

US 7,584,668 B2

MONITORING SYSTEM FOR VALVE DEVICE

CLAIM OF PRIORITY

The present application claims priority from Japanese application serial no. 2006-216367 filed on Aug. 9, 2006, the content of which is hereby incorporated by reference into this application.

BACKGROUND OF THE INVENTION

1. Field of the Invention

The present invention relates to a device that can evaluate the soundness of a valve device and to a system that can judge whether the valve device is opened or closed.

2. Description of the Related Art

Conventionally, there is a method by which strain and torque are measured by a strain gauge attached in the vicinity of a valve driver so as to monitor the soundness of a valve drive unit and to estimate the degree of abnormality and deterioration based on the change over time. For example, as described in JP-A-8-261355, a strain gauge is mounted onto an immovable hollow circular cylinder disposed in the vicinity of the valve stem to measure torque and thrust.

In the above-mentioned patent document, there is a problem in that because a strain gauge that is a conventional strain measurement device is used, when the temperature in the valve device changes, sensitivity of the gauge cannot be sufficiently compensated and small changes of thrust and torque cannot be measured. For example, when measuring frictional force or torque at the time a valve opens or closes, highly accurate measurement is necessary; however, there is a problem in that if the temperature of the piping to which the valve is installed changes, sufficiently accurate measurement is not possible.

Furthermore, there is a problem in that motors or relays which become a major noise source are often disposed in the vicinity of the location where a strain measurement device is attached, thereby making accurate measurement impossible because the strain gauge tends to pick up that noise. Specifically, when conducting remote monitoring, there is a problem in that if a resistance value of the strain gauge increases so as to reduce current consumed by a measurement system, data on small strain is greatly interfered by noise, thereby decreasing the measurement accuracy.

Furthermore, because a plurality of strain gauges, which are conventional strain measurement devices, are usually required to be attached, there is a problem in that a large enough area is required, then it is difficult to attach those strain gauges to a small valve device, and maintenance inspection may be interfered. Specifically, there is a problem in that a wireless system which conducts remote monitoring requires a large device, which tends to hinder the maintenance inspection of the valve device from being easily conducted.

Furthermore, as described in JP-A-8-261355, when measuring torque and thrust by using a strain gauge, it is necessary to attach a plurality of strain gauges so that they are orthogonal to each other and have a specific angle to the valve stem. However, from the practical point of view, it is difficult to attach the gauges to a complicated shaped component such that they are orthogonal to each other, and an error of the angle at which gauges were installed tends to be generated. That is, there is a problem in that accurate measurement is impossible due to an error of the angle at which gauges were installed.

Furthermore, there is a problem in that because thin film which functions as a strain detection portion of a strain gauge has a fatigue life, it is not reliable enough to be used for a long period of time required during the life time of a valve device.

Furthermore, because the measurement system of a valve device remotely monitors the valve device's abnormality and evaluates its life, the measurement system is often driven by a battery, low electric power, or an RF power supply. However, in that case, there is a problem in that power consumption of the strain gauge must become large to prevent noise; accordingly, electric power is insufficient resulting in limited operation time.

Moreover, conventionally, strain generated at the time a strain gauge is attached cannot be compensated. For this reason, there is a problem in that if gain of a strain gauge is increased at the time of wireless transmission so as to conduct accurate measurement, the value exceeds the measurement range.

SUMMARY OF THE INVENTION

Under these circumstances, it is an object of a preferred embodiment of the present invention to provide a system for evaluating the soundness of a valve device that can accurately measure thrust and torque even when the temperature of the piping changes.

It is a further object of another preferred embodiment of the present invention to provide a system for evaluating the soundness of a valve device that is less interfered by external noise and can conduct accurate measurement with small power consumption.

It is a further object of another preferred embodiment of the present invention to provide a system for evaluating the soundness of a valve device that can be installed in a small valve device and that does not hinder maintenance inspection or the disassembly of a valve device.

It is a further object of another preferred embodiment of the present invention to provide a system for evaluating the soundness of a valve device that hardly generates errors due to the angle of installation when the system is attached to a valve device.

It is a further object of another preferred embodiment of the present invention to provide a system for evaluating the soundness of a valve device that is sufficiently reliable over a long period of time.

It is a further object of another preferred embodiment of the present invention to provide a measurement system that can be driven for a long period of time by a battery, low electric power, or an RF power supply.

It is a further object of another preferred embodiment of the present invention to provide a system that can conduct accurate measurement without exceeding the measurement range when the gain is increased.

The feature of the present invention is to mount a semiconductor substrate (chip) with a bridged circuit comprising a plurality of impurity-diffused resistors onto an appropriate portion of a valve device (e.g., valve stem, valve yoke, torque spring, or drive shaft). Thrust and torque of a valve device can be obtained according to voltage changes of the bridged circuit thereby monitoring the valve device. The chip is configured such that an impurity-diffused resistor is formed in a semiconductor single crystalline substrate, and the chip is installed so that a specific angle is provided between the direction of current flow along the impurity-diffused resistor and that of the valve device's valve stem.

ADVANTAGES OF THE INVENTION

According to the present invention, it is possible to provide a monitoring system for valve device that can solve any of the above-mentioned problems.

DETAILED DESCRIPTION OF THE PREFERRED EMBODIMENTS

Preferred embodiments of the present invention will be described below with reference to the drawings. However, the present invention is not limited to the embodiments described herein.

Usually, since a semiconductor single-crystal material such as silicon has large anisotropic characteristics, its electrical properties greatly differ depending on the crystal axis direction. Accordingly, when current flows along a specific crystal axis direction, sensitivity to strain in the specific direction becomes high. Direction of the high strain sensitivity largely differs between a p-type semiconductor and an n-type semiconductor. The present invention has been for the first time achieved by considering types of impurities, crystal direction, and strain direction so that they are best suitable for construction of a monitoring system for valve device.

In the present invention, the strain sensing portion is configured as impurity-diffused resistors formed in a semiconductor single crystalline substrate which has a cubic structure such as silicon. And it is designed by considering the relation between the crystal orientation of a semiconductor substrate and a piezoresistance coefficient according to the crystal orientation so that desired characteristics can be obtained based on the relation between the direction of current flow along the impurity-diffused resistor and the strain measuring direction.

Hereafter, Miller's index is used for notation of a crystal plane and a crystal orientation of the semiconductor single crystalline substrate.

In accordance with Miller's index notation, when specifying a minus direction, a bar is usually assigned above the number. However, in this specification, the number to which a bar is to be assigned is expressed with "−" such as [−110]. Furthermore, when representing a specific plane and direction, parentheses ( ) and square brackets [ ] are used, respectively. And, when representing a plane and direction that is equivalent in the crystal structure, braces { } and angle brackets < > are used, respectively. Furthermore, in this specification, current flows along the longitudinal direction of the impurity-diffused resistor and fluctuations of the resistance value in the direction of current flow are measured. In other words, the expression, "longitudinal direction of resistor," means the direction in which current flows and fluctuation of the resistance value is measured.

First Embodiment

Figure 1:
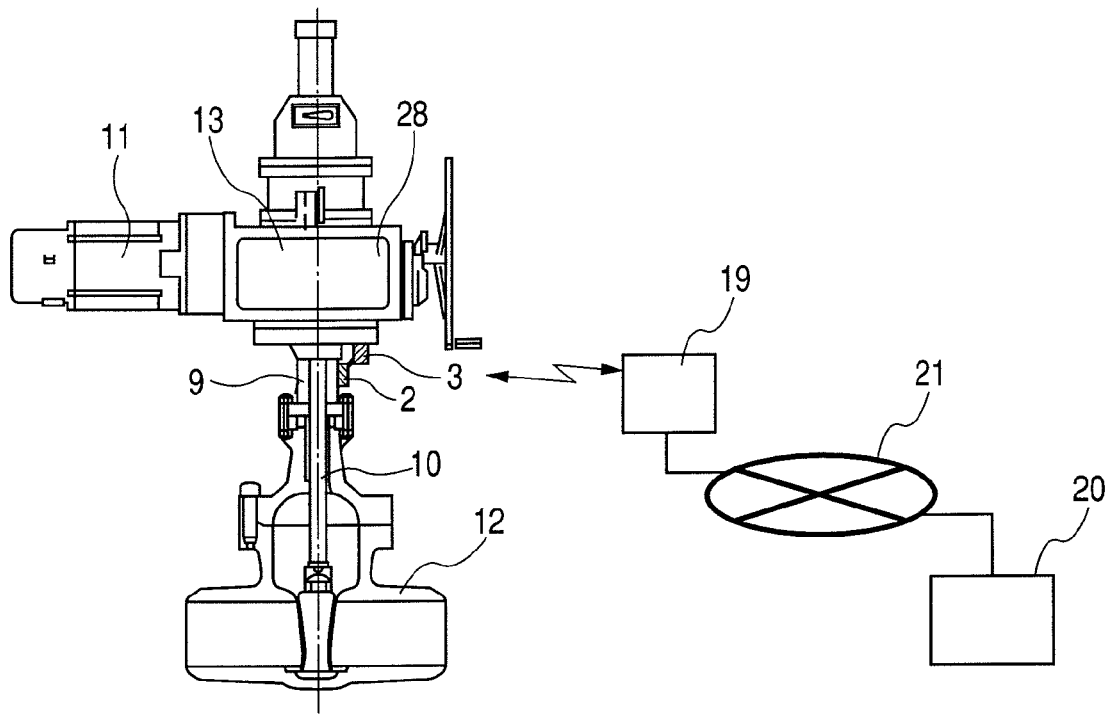
FIG. 1 is a schematic illustration of a monitoring system for valve device in a first embodiment of the present invention.
Figure 2:
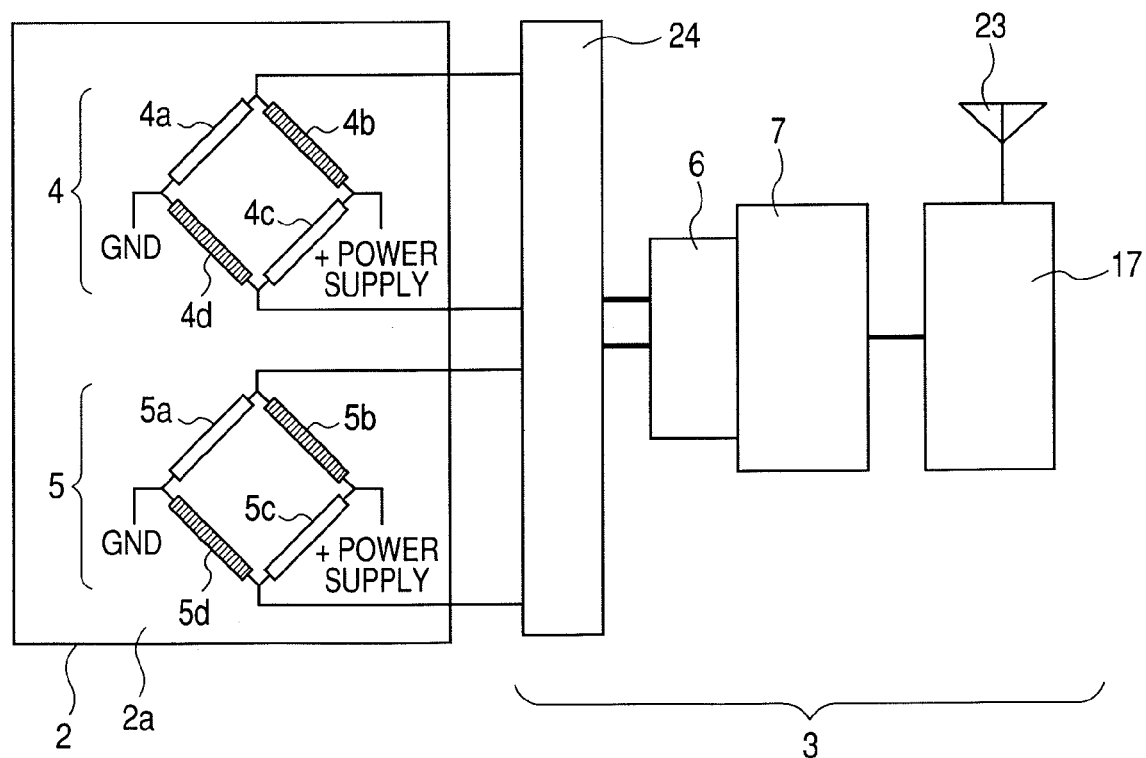
FIG. 2 is a block diagram showing the connections of an electric circuit in a first embodiment of the present invention.

A first embodiment of the present invention will be described with reference to FIGS. 1 to 4. FIG. 1 shows a schematic illustration of major portions of a monitoring system for valve device according to a first embodiment. FIG. 2 is a block diagram showing the connections of an electric circuit located around the valve device in a first embodiment.

As shown in FIGS. 1 and 2, a semiconductor substrate 2 is disposed on the surface of a valve yoke 9. An output from the Wheatstone bridged circuits 4 and 5 which function as a strain sensing portion located in the semiconductor substrate 2 is lead to a controlling and transmitting unit 3. Subsequently, the output is digitalized by an A/D converter 6 located in the controlling and transmitting unit 3 via an amplifier 24 and is computed by a controlling and processing device 7, such as CPU or MPU. After that, the processed data is transmitted by a communication module 17. The data is received by a communication module and is converted by an IP conversion module 19; and then the data is sent to the Internet 21 and is monitored by a remote monitoring center 20. At this time, it is desirable that address data unique to each controlling and transmitting unit is sent in addition to strain data from the semiconductor substrate 2. Furthermore, a backside surface of a main surface 2a of the semiconductor substrate 2 is bonded to the valve yoke 9. And it is preferable that the bonding of semiconductor substrate 2 is performed by using an adhesive bonding material, welding or fixing by bolts. Furthermore, it is possible to form a concave portion in the valve yoke 9 in which the semiconductor substrate 2 is embedded. Moreover, this embodiment shows an example in which remote monitoring is achieved by means of wireless communication and Internet connection. However, it is also possible to transmit data to a monitoring center by using a cable or utilizing a communication means such as PHS (Personal handyphone system), or cellular phone.

As shown in the block circuit diagram in FIG. 2, at least a plurality of impurity-diffused resistors 4a to 4d, 5a to 5d are configured at the main surface 2a of the semiconductor substrate 2 whose surface is {001}, and those impurity-diffused resistors are electrically connected, thereby constituting two Wheatstone bridged circuits (hereafter, referred to as bridged circuit) 4, 5.

Figure 3:
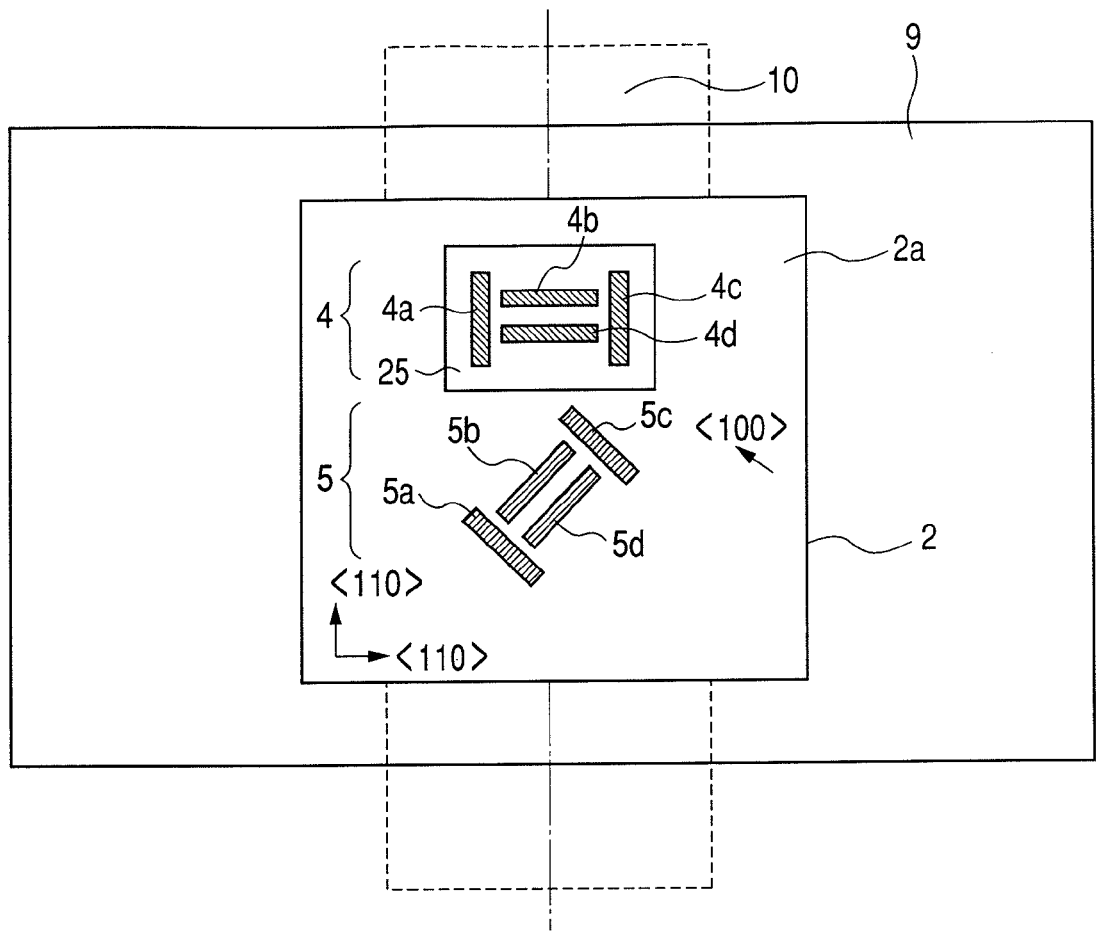
FIG. 3 shows a relationship among the impurity-diffused resistors, the semiconductor single crystalline substrate and a valve stem of a valve device in a first embodiment of the present invention.

In the form of an enlarged view of the vicinity of the valve yoke 9, FIG. 3 shows a relationship among the impurity-diffused resistors (4a to 4d, 5a to 5d), the semiconductor single crystalline substrate 2, the valve yoke 9, and a valve stem 10 of a valve device. Although, in fact, the semiconductor substrate 2 is significantly smaller than the valve stem 10 or the valve yoke 9, FIG. 3 exaggerates and enlarges the portion to show the detail structure. The vertical direction in FIG. 3 is an axial direction of the valve stem 10, and a semiconductor substrate 2 is attached onto the valve yoke 9 and impurity-diffused resistors 4a to 4d, 5a to 5d are formed in the main surface 2a opposite with the bonding surface. As mentioned before, in this embodiment, the backside surface of the main surface 2a on which impurity-diffused resistors have been configured is used as a bonding surface, however, the main surface 2a may be the bonding surface.

A bridged circuit 4 comprises p-type impurity-diffused resistors 4a to 4d formed in p-type well 25. The longitudinal directions of two of those impurity-diffused resistors (4a, 4c) that constitute opposite arms of the bridged circuit 4 are configured to be parallel to the axial direction of the valve stem 10. And the longitudinal directions of the remaining two impurity-diffused resistors (4b, 4d) that constitute the other opposite arms are formed to be perpendicular to the axial direction. Furthermore, each longitudinal direction of those impurity-diffused resistors, i.e., the direction along which current flows is made to agree with the <110> crystal direction of the semiconductor single crystalline substrate 2 in which p-type impurity-diffused resistors 4a to 4d are highly sensitive to strain. Thus, by constituting the bridged circuit 4 by providing impurity-diffused resistors 4a to 4d, it is possible to obtain large change of a resistance value due to the piezoresistive effect with respect to strain that is parallel or perpendicular to the valve stem 10. Moreover, this bridged circuit 4 is hardly sensitive to shear strain of the valve stem 10. Since vertical strain in the axial direction mainly works upon the valve yoke 9 as a reactive force of the valve stem 10, it is possible to measure thrust by the bridged circuit 4.

Herein, for example, the phrase, "impurity-diffused resistors 4a to 4d that agree with the <110> crystal direction," is used; however, even if the longitudinal direction of those resistors is not exactly in the <110> direction, almost the same effect can be expected as long as the angle deviation is within ±10 degrees. If the angle deviation exceeds that range, strain sensitivity rapidly decreases; therefore, it is desirable that impurity-diffused resistors are formed whose longitudinal directions are at an angle of within ±10 degrees from the <110> direction.

Furthermore, a description was given above in which the direction along which current flows is almost the same as the longitudinal direction of the impurity-diffused resistor pattern. However, if the direction along which current flows is the same as the direction of the above-mentioned crystal orientation, the same effect can be obtained regardless of the longitudinal direction of the pattern. On the other hand, when the direction along which current flows is made almost the same as the longitudinal direction of the impurity-diffused resistor pattern, the resistance value of the resistor can be increased; therefore, it is possible to achieve lower power consumption. Accordingly, the situation in which the direction along which current flows is the same as the longitudinal direction of the resistor pattern will be mainly described below.

Figure 4:
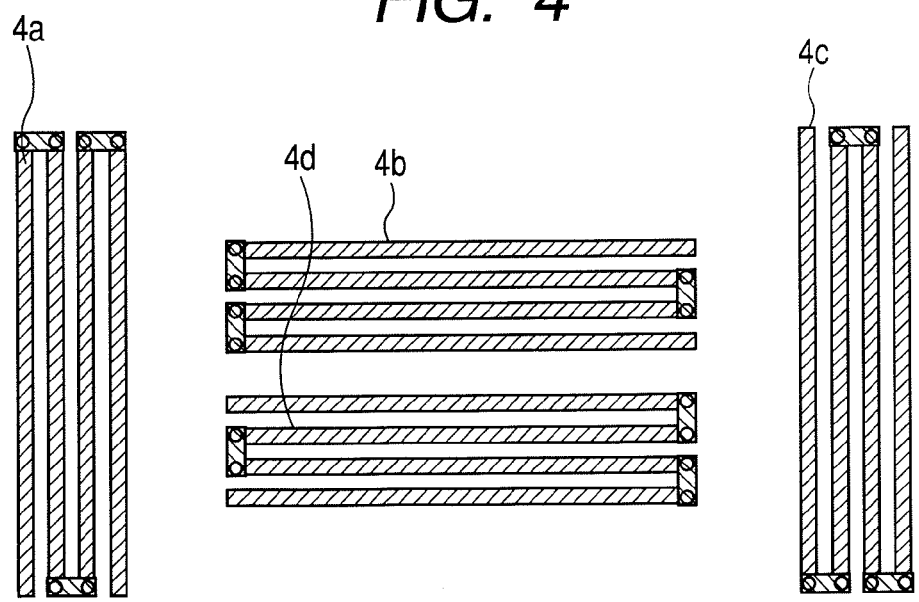
FIG. 4 is a schematic illustration showing an example of a bridged circuit in a first embodiment of the present invention.

Moreover, as shown in FIG. 4, it is possible to increase the length of the resistor in order to reduce power consumption as a result of increasing the resistance value of the resistor. In this case, the resistance value can be increased without significantly increasing the area of the sensor. In each of the impurity-diffused resistors 4a to 4d, strip lines are connected by using contact holes and are turned back so that the resistance value becomes high. Of course, the same manner of increasing the resistance value can be applied to the impurity-diffused resistors 5a to 5d.

On the other hand, a bridged circuit 5 provided in the semiconductor substrate 2 comprises n-type impurity-diffused resistors 5a to 5d. As shown in FIG. 3, the longitudinal directions of two of those impurity-diffused resistors (5a, 5c) that constitute opposite arms of the bridged circuit 5 are configured at an angle of 45 degrees to the left with respect to the axial direction of the valve stem 10. And the longitudinal directions of the remaining two impurity-diffused resistors (5b, 5d) that constitute the other opposite arms are formed at an angle of 45 degrees to the right, which is the reverse direction. That is, the longitudinal direction of the impurity-diffused resistors 5a, 5c and that of the impurity-diffused resistors 5b, 5d are at right angles to each other. Furthermore, each longitudinal direction of the impurity-diffused resistors 5a to 5d, i.e., the direction along which current flows, is made to agree with the <100> crystal direction of the semiconductor single crystalline substrate 2 in which n-type impurity-diffused resistors 5a to 5d are highly sensitive to strain. Thus, by constituting the bridged circuit 5 by providing impurity-diffused resistors 5a to 5d, it is possible to provide no sensitivity to vertical strain of the valve stem 10 but to obtain large change of the resistance value with respect to shear strain; consequently, torque can be accurately measured.

Thus, in the thrust sensor of the bridged circuit 4 and the torque sensor of the bridged circuit 5, a direction of maximum sensitivity to the strain, i.e., the longitudinal direction of the impurity-diffused resistor with respect to the single crystalline substrate, is crystallographically determined. On the other hand, an installation angle of the longitudinal direction of each impurity-diffused resistor toward the valve stem 10 is determined from the mechanical point of view. In the present invention, efforts have been made so that above two conditions can be fulfilled in one chip. That is, since impurity-diffused resistors 4a to 4d are vertical or parallel to the axial direction of the valve stem 10 and impurity-diffused resistors 5a to 5d are at a 45 degree angle to the axial direction, the angle between the resistors 4a to 4d and the resistors 5a to 5d is 45 degrees. And, with regard to the crystal axis direction of the single crystalline substrate, p-type impurity-diffused resistors 4a to 4d are formed in the direction of <110> and n-type impurity-diffused resistors 5a to 5d are configured in the direction of <100> as each direction is highly sensitive to strain; therefore, those two types of resistors are disposed at a 45-degree angle. As a result, by using one semiconductor substrate 2, thus configured, it is possible to measure thrust and torque of a valve device.

In other words, in the embodiment shown in FIG. 3, installation is executed so that the longitudinal direction of the valve stem 10 is the same as the <110> direction of the semiconductor substrate 2.

As described above, since only one semiconductor substrate 2 is mounted to the valve yoke 9, an installation angle error can be decreased thereby enabling accurate measurement when compared to the use of a plurality of strain gauges bonded at specific angles.

Furthermore, since the bridged circuits 4 and 5 are fabricated by using a semiconductor circuit production process, they can be microscopic. As a result, the semiconductor substrate 2 can be also made small; thus, the substrate can be mounted to a small valve device. And since the substrate is small, there is an advantage in that it allows for easy maintenance and inspection of the valve device. Specifically, if a plurality of sensors are conventionally installed, the complicated wiring interferes with the maintenance and inspection of the valve device. However, in the present invention, since wires extend from only one portion of the semiconductor substrate 2, handling those wires is very easy, which is an advantage. Furthermore, since semiconductor substrates 2 are produced by using a semiconductor circuit production process, the unit price of one chip can be low.

Moreover, in the present invention, because piezoresistive effect of the semiconductor crystal is used for detecting strain, sensitivity to strain of the semiconductor substrate 2 is higher than that of a conventional strain gauge by one digit or more. Accordingly, it is possible to achieve a system for evaluating the soundness of a valve device, which can accurately detect strain.

Furthermore, although piezoresistive effect of the semiconductor crystal greatly depends on the temperature, in the present invention, the combination of bridged circuits 4 and 5 provides a temperature compensation function. Herewith, even when the temperature of fluid (liquid, gas, etc.) flowing through a valve casing 12 changes, accurate measurement can be conducted. Conventionally, a strain gauge is mounted to the valve yoke 9, and a dummy gauge for compensating the temperature is installed in the vicinity of the valve yoke 9 without bonding onto the valve yoke 9 body. For this reason, a temperature difference is easy to occur between the dummy gauge and the strain sensor, resulting in incorrect measurement. On the contrary, in the present invention, because a temperature compensation method by the bridged circuit is utilized, even if the temperature changes while the soundness of the valve device is evaluated, highly accurate measurement is possible. Furthermore, in the present invention, because a single crystalline substrate is used, heat transfer coefficient is enough high; therefore, there is an advantage in that there is almost no temperature difference in the semiconductor substrate 2.

Furthermore, in the present invention, because microscopic bridged circuits are configured by using a semiconductor circuit production process, least magnetic flux passes through the bridged circuits; therefore, those circuits are hardly affected by noise. Accordingly, even if a large noise source, such as motors or relays, is located near by, accurate measurement can be carried out without the interference of noise.

Furthermore, since a conventional strain gauge is constructed such that metal thin film and thin lines are formed on an organic film, there is a problem in long-term reliability due to corrosion and fatigue of the metal thin film and deterioration of the organic film. On the contrary, since the present invention uses a semiconductor single crystalline substrate as a bulk, strain (deformation) caused by stress is slight, resulting in excellent long-term reliability. Since monitoring systems for valve device are usually used for more than 10 years, it is an advantage that long-term reliability can be ensured.

In this embodiment, two types of bridged circuits are formed in one semiconductor substrate 2 to simultaneously measure thrust and torque, however, it is possible to use this embodiment for a system which measures either thrust or torque.

Second Embodiment

Figure 5:
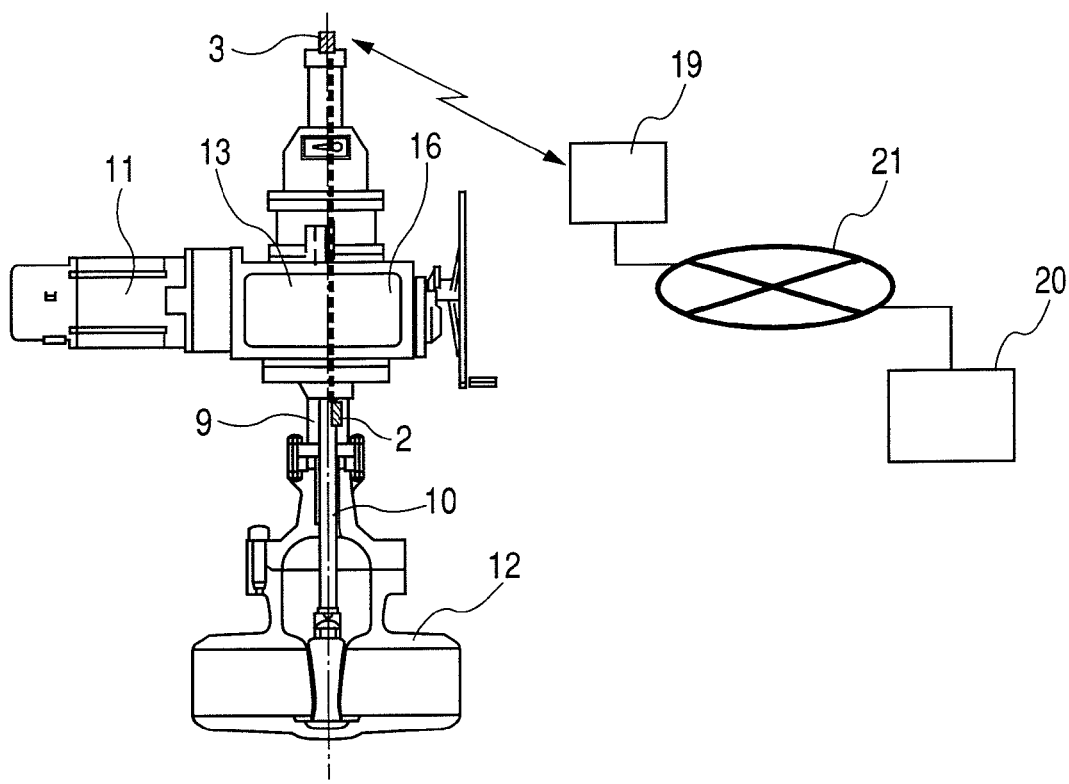
FIG. 5 is a schematic illustration of a monitoring system for valve device in a second embodiment of the present invention.

A second embodiment of the present invention will be described with reference to FIG. 2 and FIGS. 5 to 12. FIG. 5 is a schematic illustration of a monitoring system for valve device in a second embodiment. As shown in FIGS. 2 and 5, in this embodiment, a semiconductor substrate 2 is mounted to the valve stem 10, and a controlling and transmitting unit 3 also mounted to the valve stem 10 digitalizes data and transmits it. An output from the Wheatstone bridged circuits 4 and 5 which function as a strain sensing portion located in the semiconductor substrate 2 is lead to the controlling and transmitting unit 3. Subsequently, the output data is digitalized by an A/D converter 6 located in the controlling and transmitting unit 3 via an amplifier 24 and is computed by a controlling and processing device 7, such as CPU or MPU. After that, the computed data is transmitted by a communication module 17. The data is received by a communication module and is converted by an IP conversion module 19; and then the data is sent to the Internet 21 and is monitored by a remote monitoring center 20.

Figure 8:
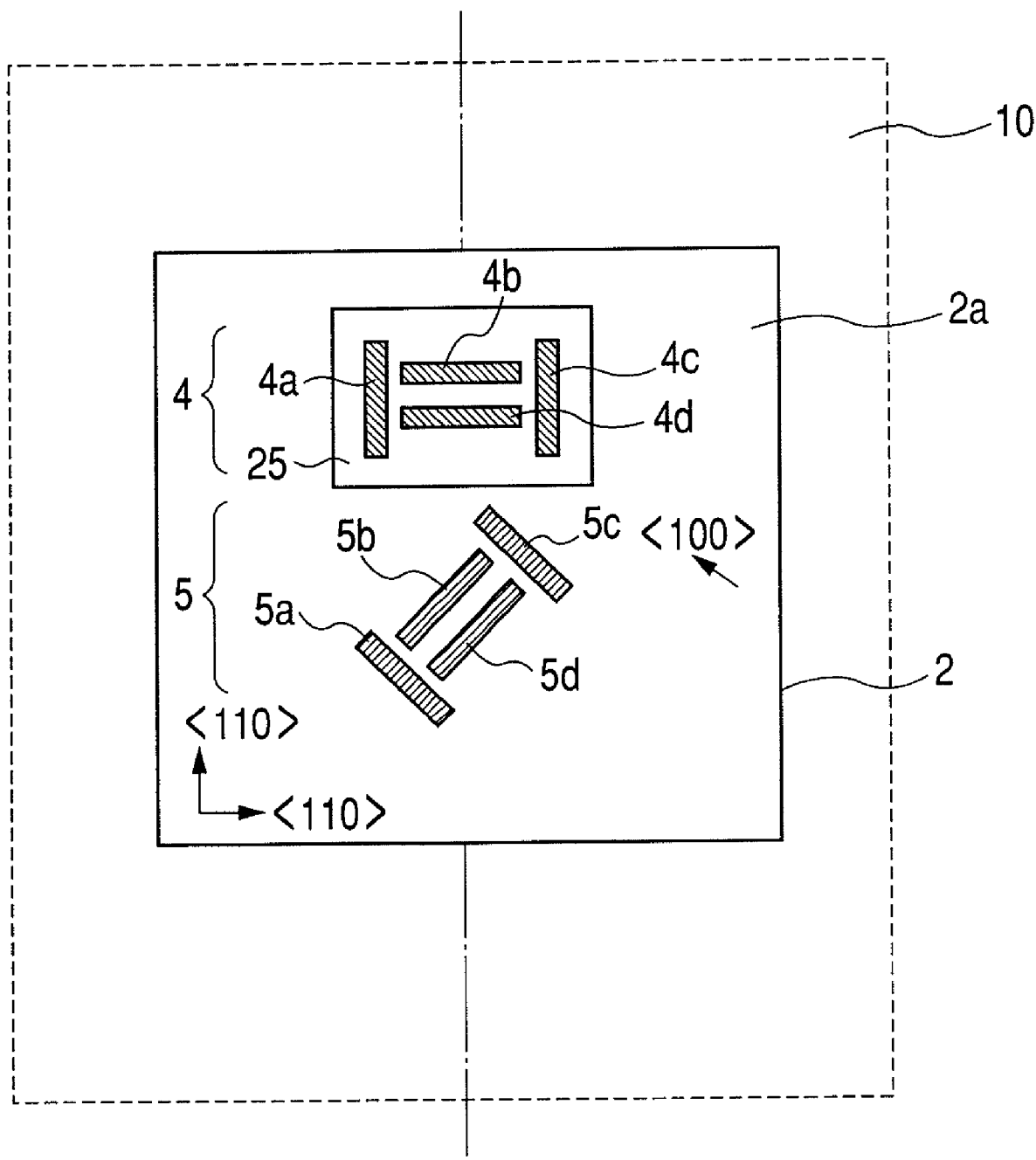
FIG. 8 shows a relationship among the impurity-diffused resistors, the semiconductor single crystalline substrate and a valve stem of a valve device in a second embodiment of the present invention.

FIG. 8 shows a relationship among the impurity-diffused resistors (4a to 4d, 5a to 5d), the semiconductor single crystalline substrate 2 and a valve stem 10 of a valve device in a second embodiment. In the same manner as the first embodiment, p-type impurity-diffused resistors 4a to 4d constitute a bridged circuit 4, and the longitudinal directions of those impurity-diffused resistors are configured to be parallel or perpendicular to the axial direction of the valve stem 10. Furthermore, each longitudinal direction of those resistors, i.e., the direction along which current flows is made to agree with the <110> crystal direction of the semiconductor single crystalline substrate 2. By disposing impurity-diffused resistors as stated above, sensitivity becomes high only with regard to the vertical strain which is parallel or perpendicular to the valve stem 10; consequently, thrust can be measured by the bridged circuit 4.

Also in the same manner as the first embodiment, n-type impurity-diffused resistors 5a to 5d constitute a bridged circuit 5, and the longitudinal directions of the resistors 5a to 5d are formed to be at an angle of 45 degrees both to the right and left to the axial direction of the valve stem 10. Herewith, torque of the valve stem 10 can be accurately measured.

That is, in an embodiment shown in FIG. 8, installation of the semiconductor substrate 2 to the valve stem 10 is executed such that the axial direction of the valve stem 10 is the same as the <110> direction of the semiconductor single crystalline substrate 2.

Moreover, it is possible to make a diameter of a part of the valve stem 10 larger than that of other part, to make the portion hollow and to mount a semiconductor substrate 2 in the vicinity of the surface area. In that case, there is an advantage in that sensitivity increases.

Furthermore, when mounting a semiconductor substrate 2 to the valve stem 10, it is desirable that it be attached to a portion between the sealing member which prevents liquid from leaking and the gear that is disposed on the valve stem 10 and that transmits a drive force from the motor (drive unit) 11. If a semiconductor substrate 2 is mounted to the lower part of the valve stem under the sealing member, i.e., on the valve body side, it is difficult to connect the semiconductor substrate 2 to the controlling and transmitting unit 3. If the semiconductor substrate 2 is mounted to the upper part of the valve stem above the gear, there is a problem in that it is difficult to measure torque. Therefore, by mounting the semiconductor substrate 2 to the valve stem 10 between the gear and the sealing member, those problems will not occur.

On the other hand, when considering the case of the conventional strain gauge, it is difficult to simply mount a strain gauge to the valve stem 10 and operate it. Because the valve stem 10 rotates, it is difficult to supply power externally through a cable. Then it is necessary to mount a power supply apparatus for the mounted strain gauge with a wireless communication function to the rotating valve stem. Moreover, when an ordinary strain gauge is used, and even if a power supply is provided inside the controlling and transmitting unit 3, since a power consumption of the strain gauge is large, electric power is consumed quickly, resulting in difficult for a practical use. Furthermore, it can be considered that the amount of electrical storage can increase by increasing the power supply (e.g., battery) inside the controlling and transmitting unit 3, however, it is not practical because the size of the controlling and transmitting unit 3 increases and there are problems in mounting it to the valve stem.

On the contrary, in this embodiment, even in situation where power consumption (current flow) is reduced by increasing resistance value of the impurity-diffused resistors (4a to 4d, 5a to 5d), the noise-resistance does not deteriorate and accurate measurement can be executed. Accordingly, it is possible to reduce power consumption of the impurity-diffused resistors to one hundredth or less compared with that of the conventional strain gauge without deteriorating the performance, and long-term monitoring is possible by a small internal power supply. That is, monitoring anomaly in a valve device by a thrust sensor and a torque sensor mounted to the valve stem 10 can be achieved as the result of the existence of a semiconductor substrate 2 according to the present invention. Although sensitivity is high when detection is executed on the valve stem 10, there is a problem in that the temperature of the valve stem 10 is easy to fluctuate more than that of the valve yoke 9 because it faces fluid, resulting in occurring an error. However, in this embodiment, the bridged circuits are formed in the semiconductor substrate 2, resulting in accurate compensation in response to the temperature change; and thus, the temperature fluctuation problem has been solved thereby enabling accurate measurement and diagnosis.

Figure 6:
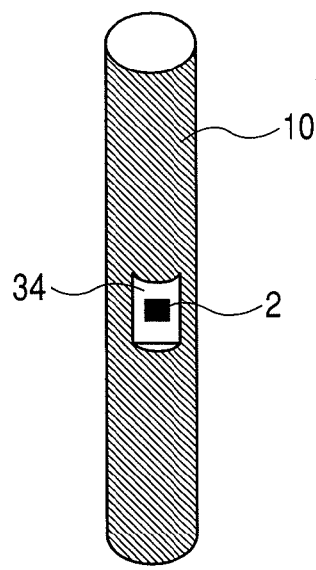
FIG. 6 is a schematic illustration showing an example of mounting a semiconductor substrate to a valve device in a second embodiment of the present invention.

FIG. 6 is a schematic illustration showing an example of mounting a semiconductor substrate 2 to a valve stem 10 in a second embodiment of the present invention. As shown in FIG. 6, when mounting a semiconductor substrate 2 to the valve stem 10, it is preferable that a planer portion 34 for installation of the semiconductor substrate 2 is formed on the valve stem 10. When a semiconductor substrate 2 with a plane shape is mounted to a curved surface of the valve stem 10, a gap is naturally generated between a bonding surface of the substrate and an installation surface of the valve stem. This gap causes strain sensitivity of the semiconductor substrate 2 to decrease as well as causes fluctuation of sensitivity. Since a semiconductor substrate 2 is thin, it can be bent and installed. However, in that case, bending a semiconductor substrate 2 causes imbalance of the bridged circuits, and a problem arises in that a large output offset is generated. Accordingly, as shown in FIG. 6, a planer portion 34 is configured on the valve stem 10, and a substrate is mounted onto that portion, thereby reducing the fluctuation of sensitivity as well as reducing output offset; consequently, accurate and preferable measurement can be executed.

Figure 7:
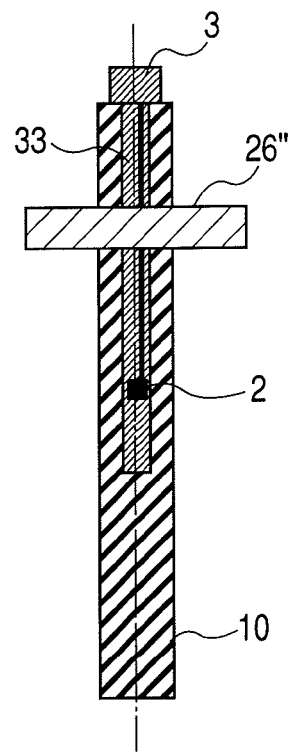
FIG. 7 is a schematic illustration showing another example of mounting a semiconductor substrate to a valve device in a second embodiment of the present invention.

FIG. 7 is a schematic illustration showing another example of mounting a semiconductor substrate to a valve device in a second embodiment of the present invention. As shown in FIG. 7, it is possible to create a hole in the valve stem 10 in its longitudinal direction, to install the semiconductor substrate 2 in the hole and to embed it with filling 33. Wiring coming from the semiconductor substrate 2 is laid along the hole created in the valve stem 10, and is connected to the controlling and transmitting unit 3 provided outside of the valve stem 10. Furthermore, in the same manner as the first embodiment, the bridged circuit 4 comprises p-type impurity-diffused resistors 4a to 4d located in the semiconductor substrate 2, and those impurity-diffused resistors are disposed such that the longitudinal directions of the impurity-diffused resistors are parallel or perpendicular to the axial direction of the valve stem 10. Furthermore, the longitudinal direction of the resistors, i.e., the direction along which current flows, is disposed such that it agrees with the <110> direction of the semiconductor single crystalline substrate 2. Or, the bridged circuit 5 comprising n-type impurity-diffused resistors can be disposed such that the longitudinal directions of those resistors are parallel or perpendicular to the axial direction of the valve stem 10; and furthermore, the longitudinal directions of the impurity-diffused resistors agree with the <100> direction of the semiconductor single crystalline substrate 2.

In an embodiment shown in FIG. 7, torque measurement becomes relatively difficult, however, it is possible to accurately measure the thrust of the valve stem 10. Furthermore, since the semiconductor substrate 2 is embedded in the valve stem 10, there is an advantage in that environmental resistance is excellent and the substrate can be used for long period of time. Moreover, the controlling and transmitting unit 3 is mounted to the end of the valve stem 10 so that external communication is easily executed. Since the controlling and transmitting unit 3 is designed to rotate together with the valve stem 10, wiring connecting from the semiconductor substrate 2 to the controlling and transmitting unit 3 will not entwine around the valve stem 10. This is because the present invention adopts an internal power supply and wireless communication, thereby eliminating cable connections to outside; consequently the substrate can be installed in the valve stem that rotates.

In this second embodiment, when compared to the first embodiment, a semiconductor substrate 2 which is a strain measurement portion can be mounted directly to the valve stem 10; therefore, more accurate torque measurement and thrust measurement is possible. Specifically, with regard to torque measurement, when a substrate is mounted to the valve yoke 9 as shown in a first embodiment, since the valve yoke 9 is a highly rigid casting and has a complicated shape, the measurement accuracy decreases in some cases. However, in a second embodiment, since the substrate is mounted directly to the valve stem 10, there is an advantage in that shape precision is excellent and accurate measurement is possible. In addition, this embodiment also has the same advantages shown in the first embodiment.

Figure 9:
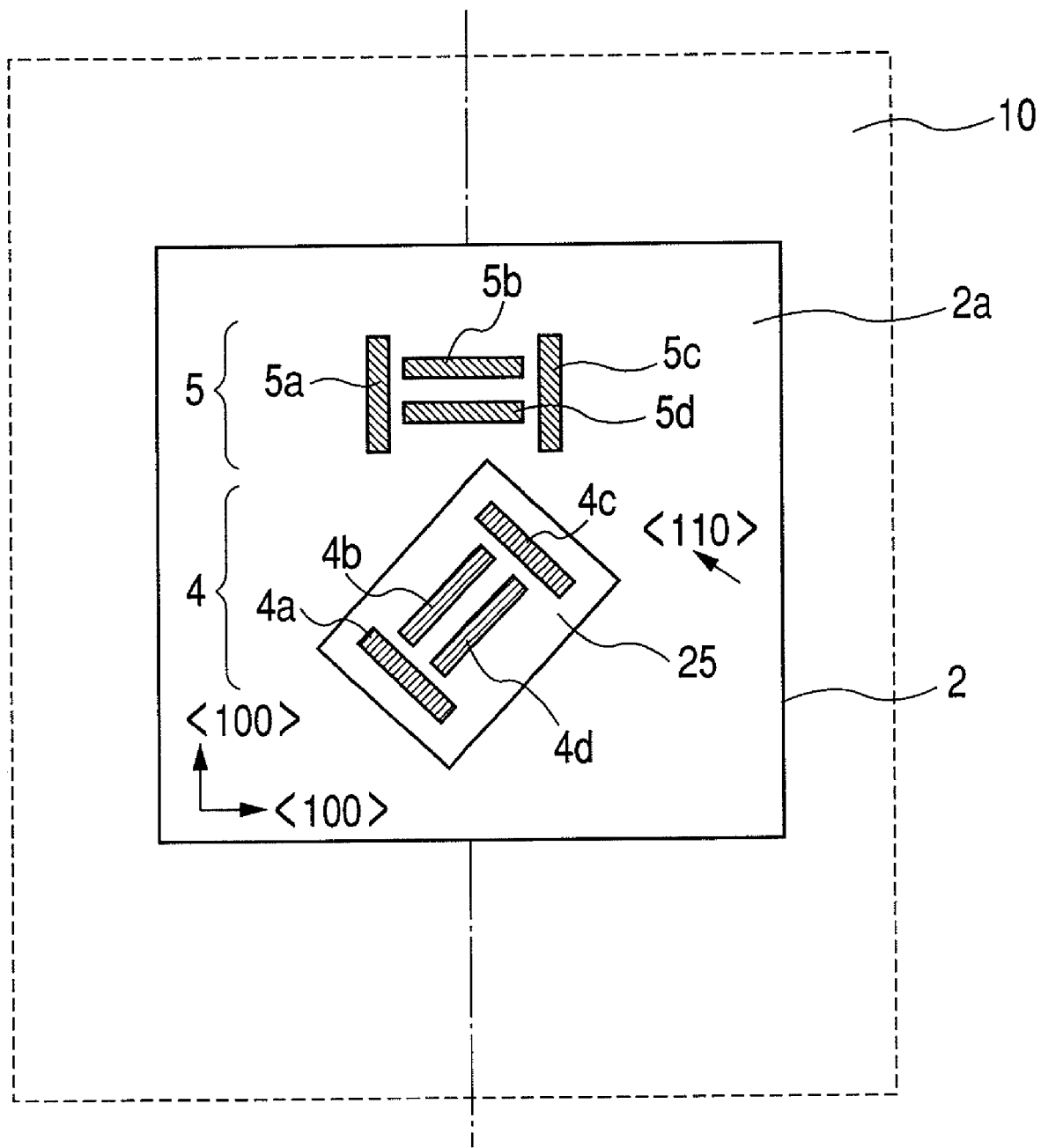
FIG. 9 shows another relationship among the impurity-diffused resistors, the semiconductor single crystalline substrate and a valve stem of a valve device in a second embodiment of the present invention.

FIG. 9 shows another relationship among the impurity-diffused resistors, the semiconductor single crystalline substrate and a valve stem of a valve device in a second embodiment of the present invention. As shown in FIG. 9, a bridged circuit 5 comprises n-type impurity-diffused resistors 5a to 5d, and the longitudinal directions of the resistors (5a to 5d) are disposed such that they are parallel or perpendicular to the longitudinal direction of the valve stem 10; furthermore, a bridged circuit 4 comprises p-type impurity-diffused resistors 4a to 4d, and the longitudinal directions of the resistors (4a to 4d) are disposed such that they are located at an angle of 45 degrees both to the right and left to the longitudinal direction of the valve stem 10. In such configuration, the same effect aforementioned can be expected. In this case, specifically, there is an advantage in that sensitivity of the thrust sensor is more excellent than that of the torque sensor. In that case, installation should be executed so that the axial direction of the valve stem 10 is the same as the <100> direction of the semiconductor single crystalline substrate 2. This arrangement can be also applied to the above-mentioned first embodiment and the embodiments described below.

Figure 30:
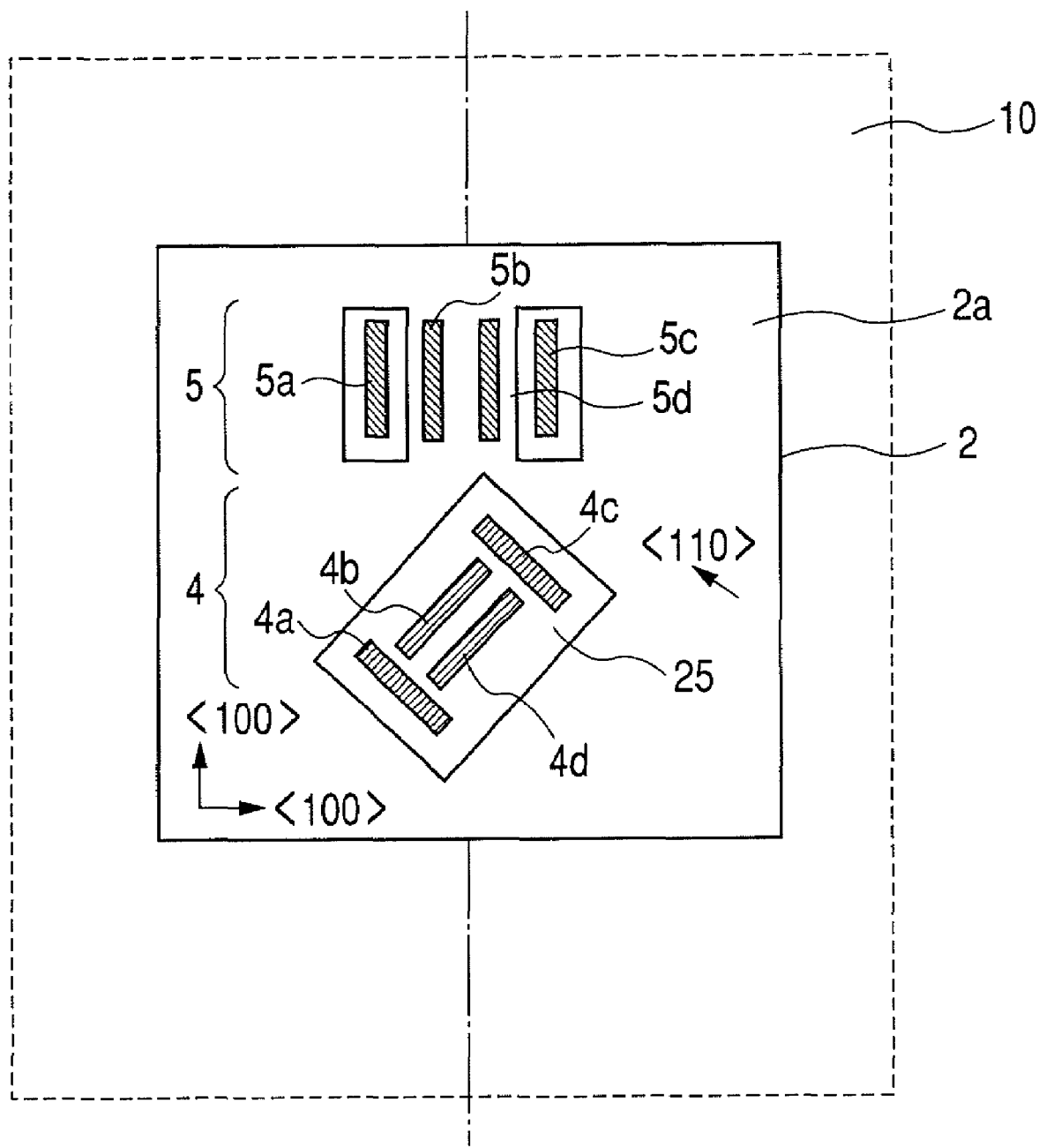
FIG. 30 shows another relationship between the impurity diffused resistors and the semiconductor single crystalline substrate in an embodiment of the present invention.

FIG. 30 shows another relationship between the impurity diffused resistors and the semiconductor single crystalline substrate in an embodiment of the present invention. In this embodiment, the arrangement of impurity-diffused resistors 5a to 5d that measure thrust is different from that in FIG. 9. In this case, impurity-diffused resistors 5a and 5c are p-type impurity-diffused resistors and the longitudinal directions of those resistors, i.e., the direction along which current flows are disposed such that they agree with the <100> direction of the semiconductor single crystalline substrate 2. Also, impurity-diffused resistors 5b and 5d are n-type impurity-diffused resistors and the longitudinal directions of those resistors, i.e., the direction along which current flows are disposed such that they agree with the <100> direction of the semiconductor single crystalline substrate 2. Also in this case, installation is executed so that the <100> direction of the semiconductor single crystalline substrate 2 agrees with the axial direction of the valve stem 10.

With the above arrangement, when measuring thrust, the force in the longitudinal direction of the valve stem can be selectively measured; accordingly an advantage is that even if bending stress acts on the valve stem, the influence can be minimized. Moreover, this arrangement can be also applied to the above-mentioned first embodiment and the embodiments described below.

Figure 10:
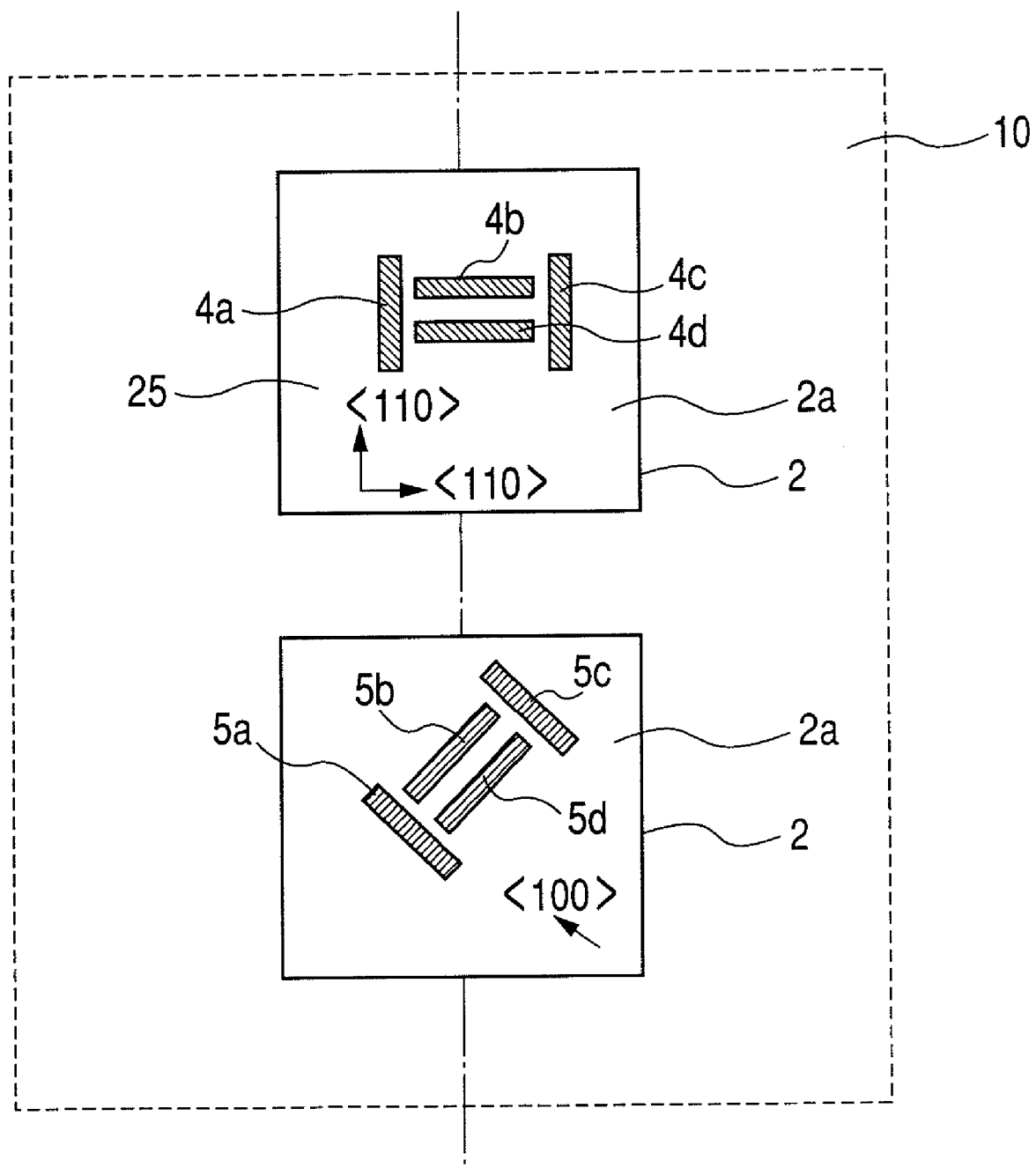
FIG. 10 shows another relationship among the impurity-diffused resistors, the semiconductor single crystalline substrates and a valve stem of a valve device in a second embodiment of the present invention.

FIG. 10 shows another relationship among the impurity-diffused resistors, the semiconductor single crystalline substrates and a valve stem of a valve device in a second embodiment of the present invention. As shown in FIG. 10, it is possible to provide two sensors separately for two semiconductor substrates 2 and bond them to the valve stem 10. In that case, although precision of installation angle decreases a little, fabrication process of the bridged circuit becomes much easier and the other advantages are the same as the above-mentioned embodiments.

Figure 11:
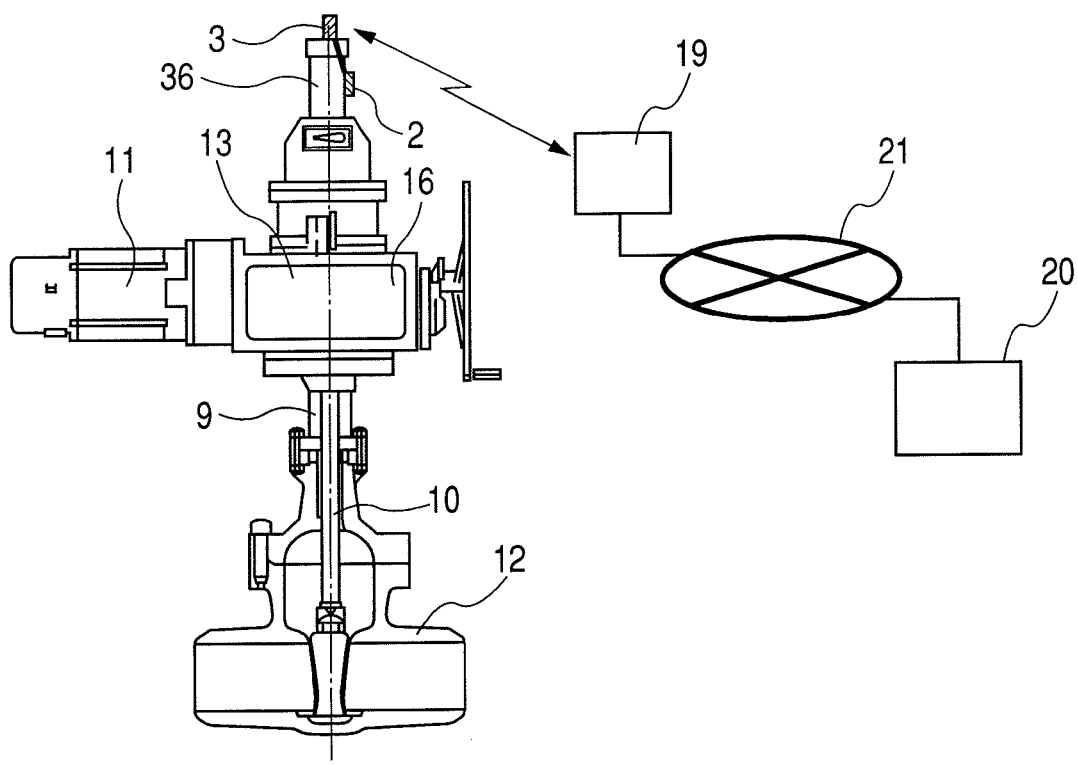
FIG. 11 is another schematic illustration of a monitoring system for valve device in a second embodiment of the present invention.
Figure 12:
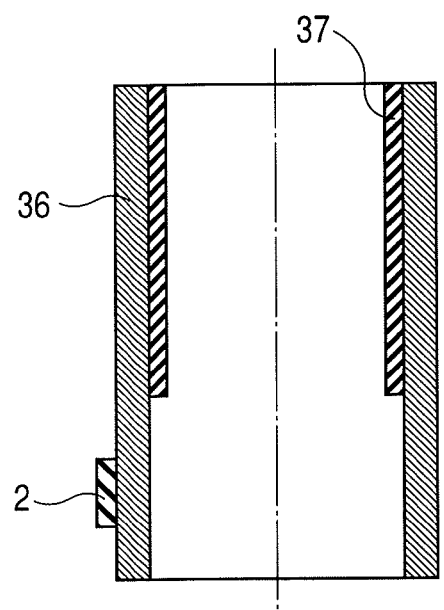
FIG. 12 is a schematic installation showing another example of mounting a semiconductor substrate to a valve device in a second embodiment of the present invention.

FIG. 11 is another schematic illustration of a monitoring system for valve device in a second embodiment of the present invention; and FIG. 12 is a schematic installation showing another example of mounting a semiconductor substrate to a valve device in a second embodiment of the present invention. As shown in FIG. 11, a semiconductor substrate 2 can be installed on a stem nut 36. In this case, as shown in FIG. 12, it is desired that the semiconductor substrate 2 be mounted to region between a nut portion 37 of the stem nut 36 and a worm gear; moreover, it is desirable that the region around which the semiconductor substrate 2 is installed is thinner than the nut portion 37. Furthermore, the semiconductor substrate 2 is installed on an outer surface of the stem nut 36 as shown in FIG. 12, however, it can be installed on an inner surface of the stem nut 36, i.e., the inside of the nut. Even if the semiconductor substrate 2 is mounted inside of the nut 36, it is desirable that the controlling and transmitting unit 3 appears outside of the stem nut 36. The direction of each impurity-diffused resistor is the same as that when a semiconductor substrate 2 is installed on the valve stem 10. By installing a substrate in the vicinity of the stem nut 36 as stated above, there is an advantage in that it is not necessary to disassemble the entire valve body when this system is installed.

Third Embodiment

Figure 13:
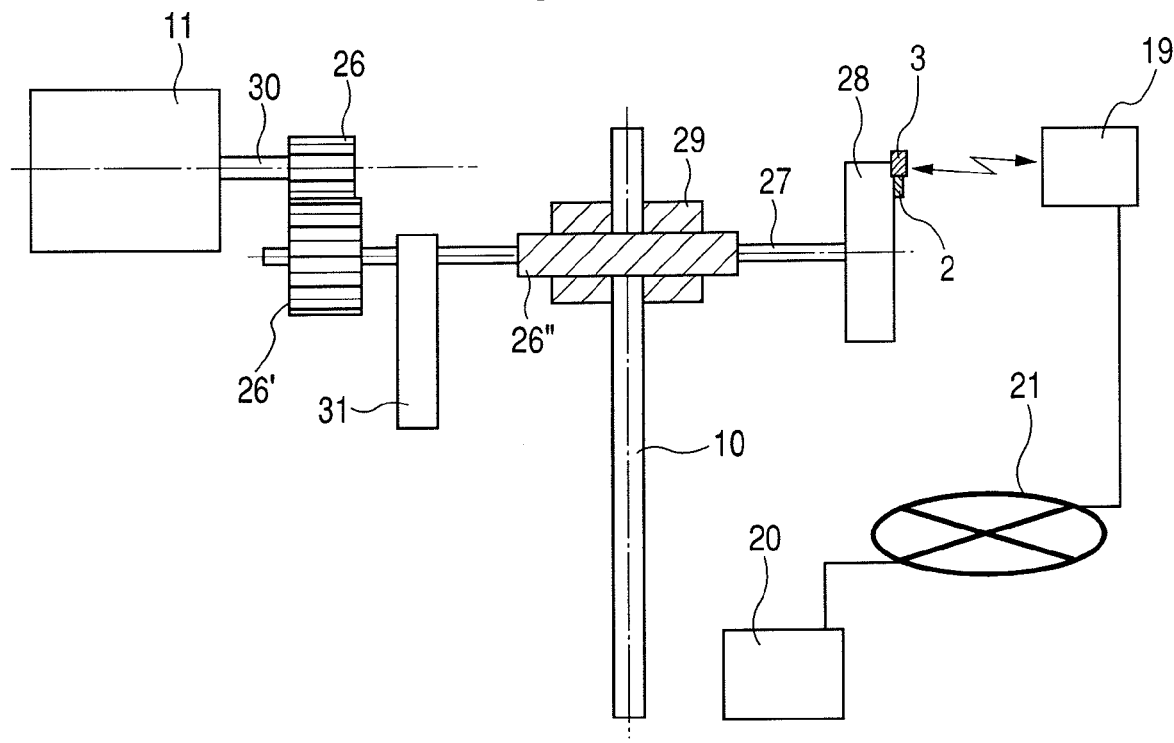
FIG. 13 is a schematic installation around a valve drive gear of a monitoring system for valve device in a third embodiment of the present invention.
Figure 14:
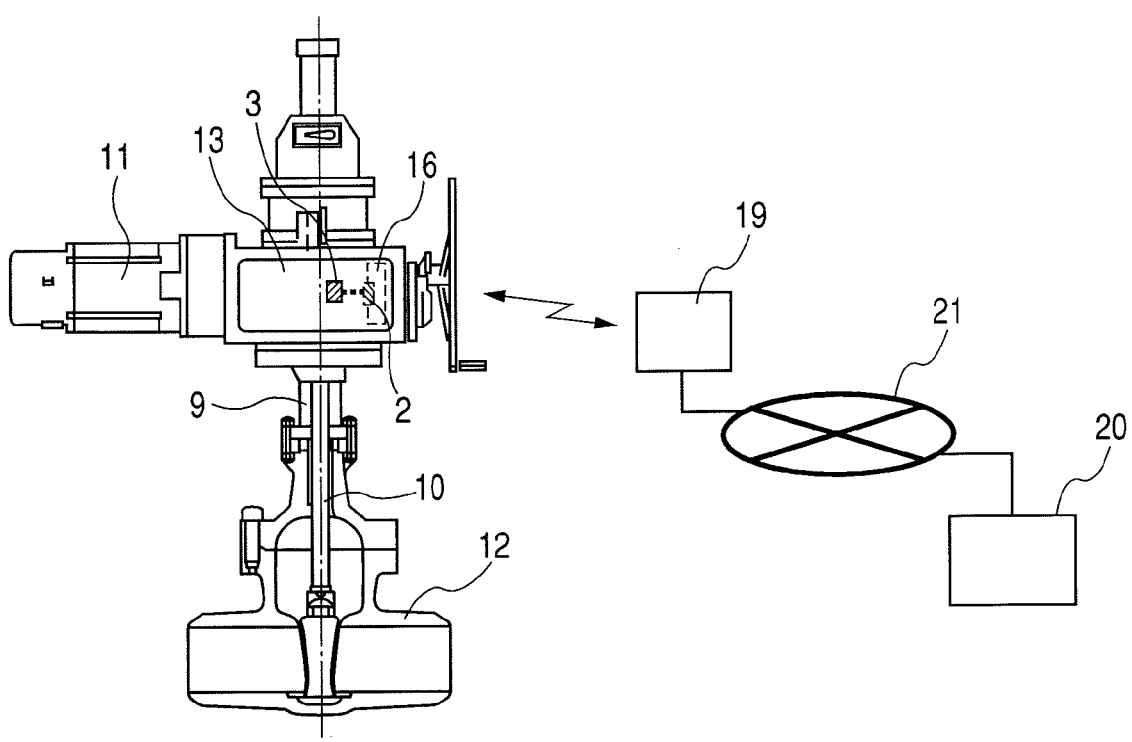
FIG. 14 is a schematic installation of a monitoring system for valve device in a third embodiment of the present invention.

A third embodiment of the present invention shows an example in which a semiconductor substrate 2 is mounted to an elastic body 28 of a torque switch in the valve device. FIG. 13 is a schematic installation around a valve drive gear of a monitoring system for valve device in a third embodiment of the present invention; and FIG. 14 is a schematic installation of a monitoring system for valve device in a third embodiment of the present invention. As shown in FIGS. 13 and 14, a driving force of a motor 11 is transmitted to the valve stem 10 via a power shaft 30, a gear 26, a gear 26', a drive shaft 27, a worm gear 29, and a gear 26" (a worm wheel). An elastic body 28 is disposed at the end portion of the drive shaft 27 so that the elastic body 28 elastically receives thrust according to load resistance of the worm gear 29. By utilizing the phenomenon that the drive shaft 27 moves right and left according to thrust that reflects load resistance, a torque switch 16 is provided which detects the movement of drive shaft 27 when the amount of movement exceeds a certain level.

On the other hand, the torque switch is usually used as a switch for emergency turn-off of the power supply to the electric motor when a predetermined torque is reached in order to prevent the valve itself from being damaged due to excessive output torque when abnormality occurs. In a conventional electric valve system, even in a situation where the torque switch according to the torque characteristics does not operate in the initial state, the torque switch sometimes operates due to deterioration with age because of abrasion or deterioration of the rotating portion of the torque switch. As a result, a plant, which uses that valve device, may have to shut down in some cases.

Accordingly, in this embodiment, a semiconductor substrate 2 is mounted to an elastic body 28, and by measuring elastic strain of the elastic body 28, torque of the drive shaft 27 is indirectly measured. Moreover, this elastic body 28 can be a usually called a torque spring. This embodiment of the present invention has a simple structure and does not include portions that are worn down or deteriorated after it has been used for a long period of time. Therefore, a significantly reliable detection system for abnormality of the valve device can be provided as compared to a system that uses a conventional torque switch. Furthermore, there is another advantage in that by intermittently taking strain data and storing the data as history, it is possible to quickly find the cause of a malfunction at the time of the occurrence. Furthermore, there is another advantage in that by measuring strain of an elastic body 28 and converting it into torque, further accurate measurement is possible.

Figure 15:
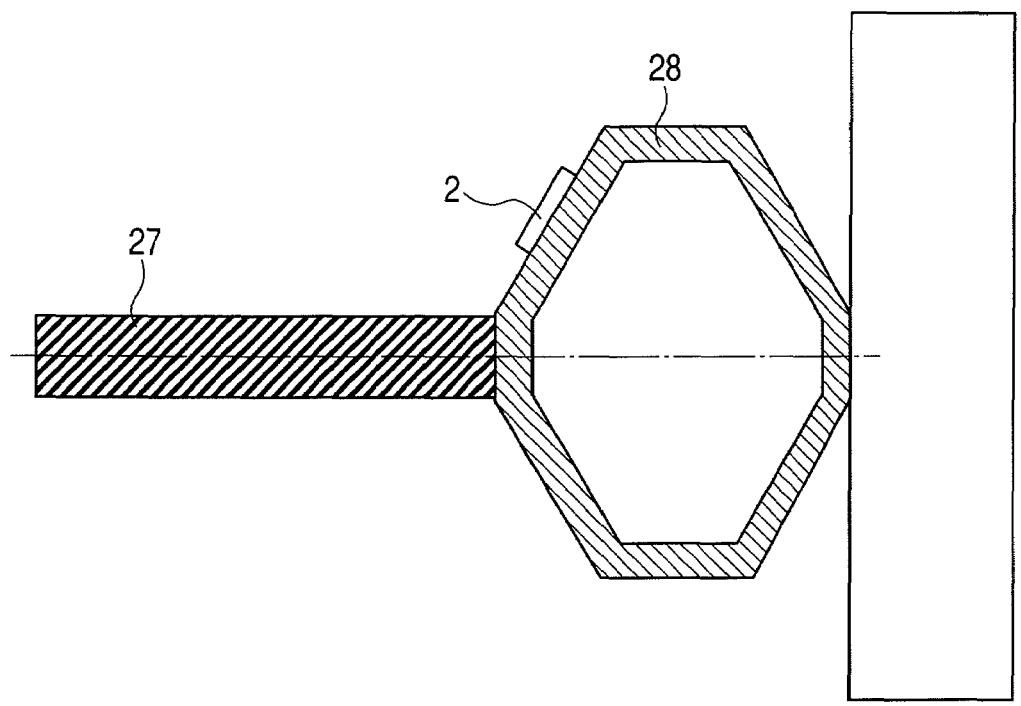
FIG. 15 is a schematic illustration showing an example of mounting a semiconductor substrate to an elastic body of a valve device in a third embodiment of the present invention.
Figure 16:
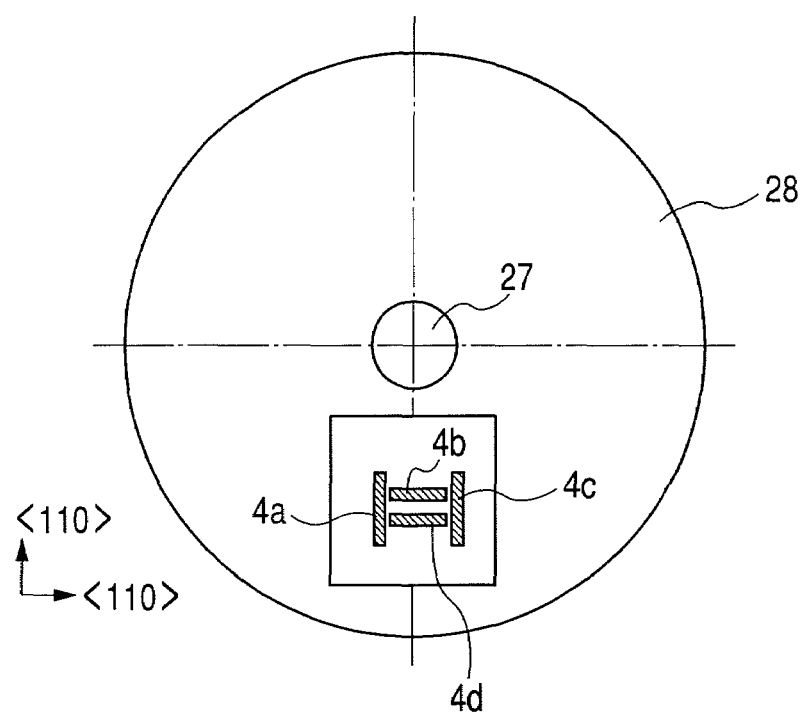
FIG. 16 is a schematic illustration of a view from left side in FIG. 15 showing an example of mounting a semiconductor substrate to an elastic body of a valve device.
Figure 17:
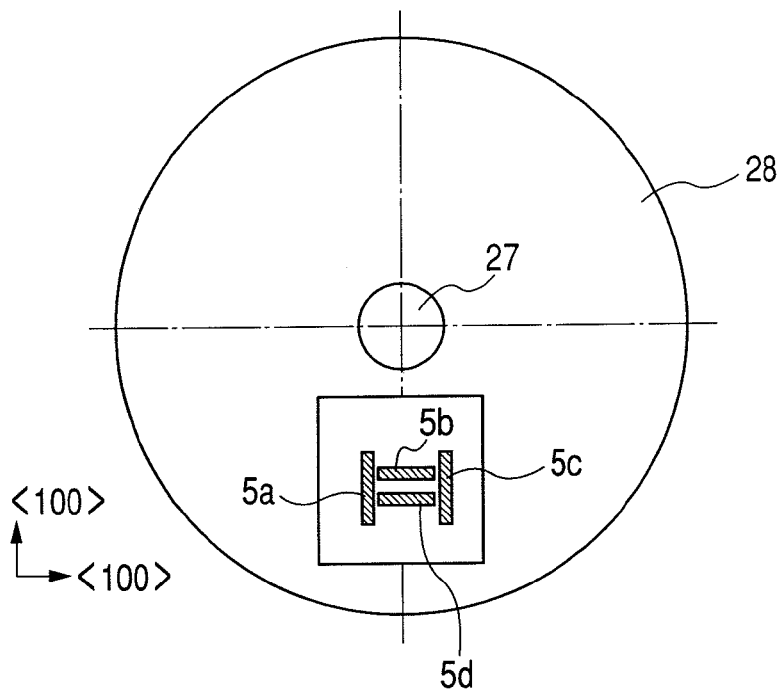
FIG. 17 is a schematic illustration of a view from left side in FIG. 15 showing another example of mounting a semiconductor substrate to an elastic body of a valve device.

FIG. 15 is a schematic illustration showing an example of mounting a semiconductor substrate to an elastic body of a valve device in a third embodiment of the present invention; FIG. 16 is a schematic illustration of a view from left side in FIG. 15 showing an example of mounting a semiconductor substrate to an elastic body of a valve device; and FIG. 17 is a schematic illustration of a view from left side in FIG. 15 showing another example of mounting a semiconductor substrate to an elastic body of a valve device. In this embodiment, an explanation is given by using a leaf spring as an example, however, a coil spring can be used in the same manner. As shown in FIGS. 15 and 16, an elastic body 28 is a circular leaf spring, which largely deforms by the right and left force applied to the drive shaft 27; and a semiconductor substrate 2 is mounted to a surface of the area in the vicinity of the central portion of the circular leaf spring. P-type impurity-diffused resistors 4a to 4d are disposed such that they are perpendicular or parallel to the diameter direction of the elastic body 28. Furthermore, the <110> direction of the semiconductor single crystalline substrate 2 is made to be perpendicular or parallel to the diameter direction of the elastic body 28. Thrust of the drive shaft 27 generates strain in the diameter direction of the circular leaf spring as the elastic body 28 and does not generate strain in the circumferential direction. As shown in FIG. 16, by disposing p-type impurity-diffused resistors 4a to 4d, it is possible to accurately detect strain in the diameter direction.

Furthermore, as shown in FIG. 17, the same effect can be obtained by disposing n-type impurity-diffused resistors 5a to 5d such that they are perpendicular or parallel to the diameter direction of the elastic body 28 and by disposing the crystal direction <100> of the semiconductor single crystalline substrate 2 such that it is perpendicular or parallel to the diameter direction of the elastic body 28.

According to this third embodiment, it is possible to mount a semiconductor substrate 2 to a valve device, which uses a conventional torque switch, without altering the structure. Therefore, a conventional torque switch can be used at the same time, thereby achieving a more reliable system.

Furthermore, since an elastic body 28 is often covered by a metal casing, it is desirable that the controlling and transmitting unit 3 be disposed on the surface of the casing. By doing so, radio waves are easily emitted outside of the casing, thereby ensuring a good communication environment.

Fourth Embodiment

Figure 18:
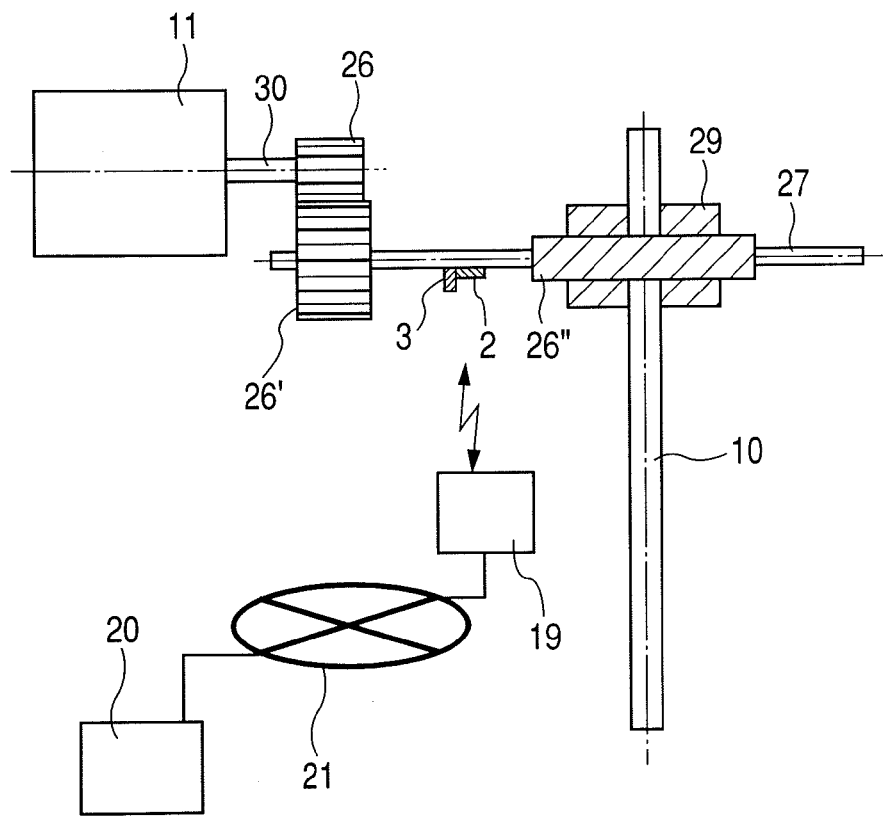
FIG. 18 is a schematic installation around a valve drive gear of a monitoring system for valve device in a fourth embodiment of the present invention.
Figure 19:
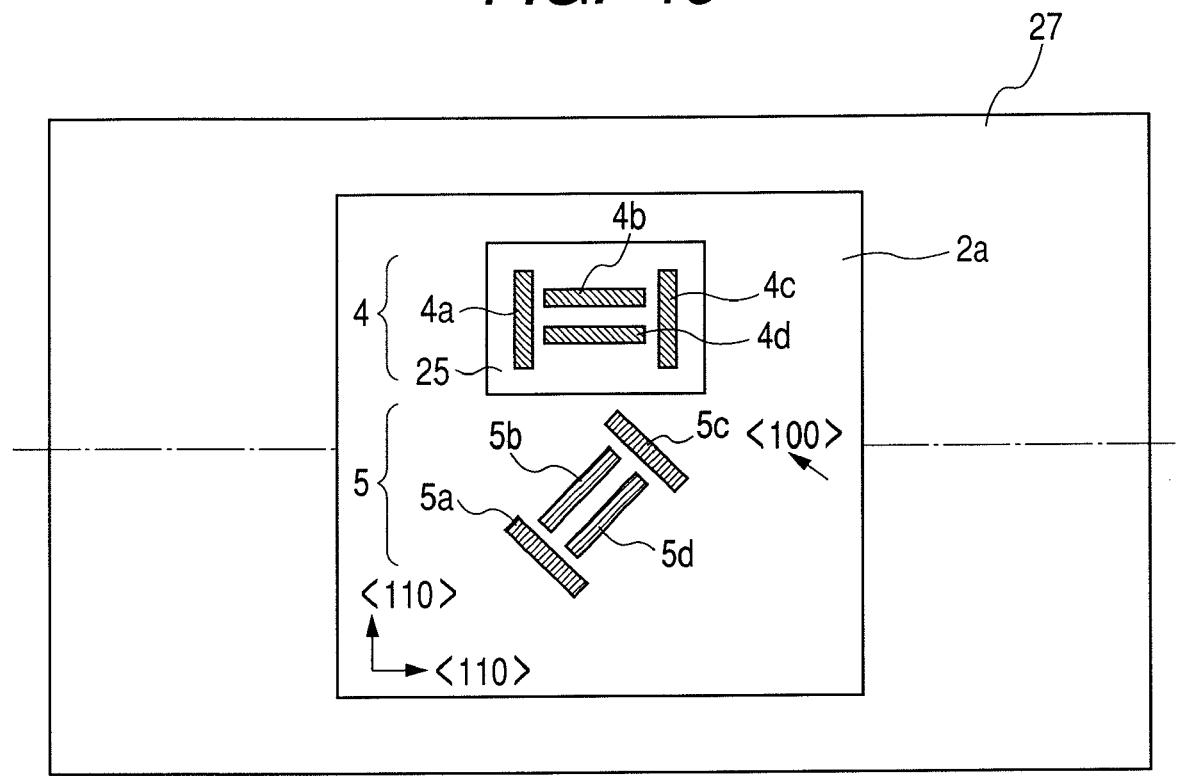
FIG. 19 shows a relationship among the impurity-diffused resistors, the semiconductor single crystalline substrate and a shaft of a valve device in a fourth embodiment of the present invention.

FIG. 18 is a schematic installation around a valve drive gear of a monitoring system for valve device in a fourth embodiment of the present invention; and FIG. 19 shows a relationship among the impurity-diffused resistors, the semiconductor single crystalline substrate and a shaft of a valve device in a fourth embodiment of the present invention. In this embodiment, a semiconductor substrate 2 is mounted to the drive shaft 27 located between a gear 26' and a worm gear 29 engaged a gear 26" (a worm wheel). Furthermore, as shown in FIG. 19, a bridged circuit 4 comprises p-type impurity-diffused resistors 4a to 4d; and the longitudinal direction of the resistors is disposed such that it is parallel or perpendicular to the axial direction of the drive shaft 27. Furthermore, a bridged circuit 5 comprises n-type impurity-diffused resistors 5a to 5d; and the longitudinal direction of the resistors is disposed such that it is located at an angle of 45 degrees to the right and left to the axial direction of the drive shaft 27.

By doing so, torque and thrust between the motor 11 and the worm gear 29 can be measured. By comparing those values with the values of torque and thrust at a portion of the valve stem 10, it is possible to identify a portion, which has reached the end of its life, and/or to investigate quickly the cause of a malfunction.

Furthermore, by disposing a controlling and transmitting unit 3 to the drive shaft 27 in the vicinity of the semiconductor substrate 2, and by constructing a wireless system, a simple and easy-to-use system can be achieved; because the controlling and transmitting unit 3 can rotate with the drive shaft 27, a complicated device such as a slip ring is not necessary. Furthermore, the maintenance ability of the valve device is much improved.

Fifth Embodiment

A fifth embodiment of the present invention will be described below with reference to FIGS. 20 to 22. This embodiment is an example in which the present invention is applied to a manual valve 31.

In plants, an enormous amount of time and labor is spent to the operation of manual valves, e.g., when valves have been opened and closed during periodic plant inspection, conditions of open and close of all manual valves must be checked to store the inspection data. Therefore, if open and close conditions of all manual valves can be remotely monitored, there will be a large advantage in that costs can be reduced and that reliability of the plant operation will increase.

Conventionally, with regard to the system that remotely monitors open and close conditions of all manual valves, as described in JP-A-8-326950, the monitoring system, which detects the degree of valve opening by a rotation angle sensor and displays the result, is proposed. However, in the system, because the rotation angle gradually changes when a valve is opened or closed due to looseness after being used for a long period of time, there is a problem in that a "close" signal tends to be displayed even when the valve does not have enough force to completely seal.

Figure 20:
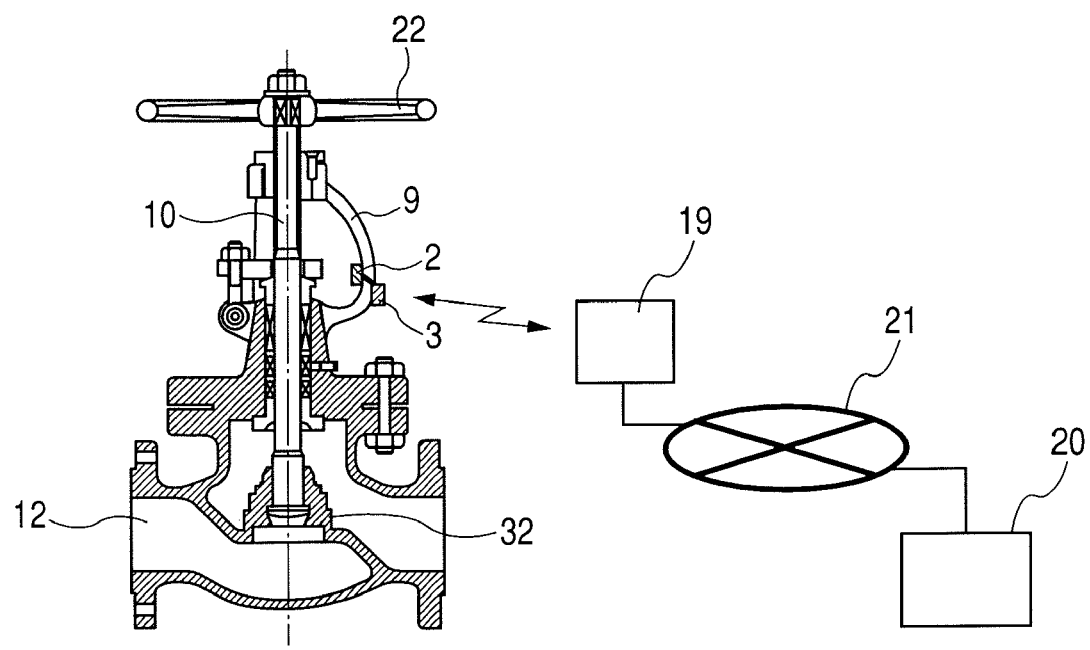
FIG. 20 is a schematic illustration of a monitoring system for valve device in a fifth embodiment of the present invention.

FIG. 20 is a schematic illustration of a monitoring system for valve device in a fifth embodiment of the present invention. As shown in FIG. 20, in this embodiment, a semiconductor substrate 2 is mounted to the valve yoke 9 to monitor the strain condition. By doing so, it is possible to directly monitor compression force that the valve body 32 presses onto the valve casing 12, thereby making it possible to directly monitor the close condition of the valve. Accordingly, even when looseness or shakiness occurs due to the long-term use, the seal can be surely monitored. That is, it is possible to judge reliably whether fluid leakage may occur or not.

The arrangement of impurity-diffused resistors within the semiconductor substrate 2 may be the same as that in FIG. 3. Specifically in this embodiment, because it is necessary to monitor compression force that the valve body 32 presses, only a bridged circuit 4 may be used. By doing so, the same effect as the first embodiment is expected, and a significant advantage is obtained in that remote monitoring is possible to reliably prevent fluid from leaking as mentioned above. Furthermore, when monitoring torque as well by simultaneously using a bridged circuit 5, an additional advantage is gotten in that it is possible to detect foreign objects lodged in the screw thread of the valve stem 10 when the valve is opened and closed.

Furthermore, it is desirable that a semiconductor substrate 2 be mounted to the inner side surface of the valve yoke 9 as shown in FIG. 20, i.e., the surface near the valve stem 10; and it is desirable that a controlling and transmitting unit 3 be installed on the outer side surface of the valve yoke 9. Because tensile strain on the inner side surface of the valve yoke 9, which is caused when the valve is closed with a certain force, is significantly greater than that on the outer side surface, installing the substrate 2 on the inner side surface of the valve yoke 9 makes it possible to detect the degree of seal with good sensitivity. Furthermore, the controlling and transmitting unit 3 comprises a radio wave transmission source and an antenna 23 inside as shown in FIG. 2. And travel distance of the radio wave becomes shorter as the transmitted radio wave is surrounded by a metal body. Accordingly, it is desirable that the controlling and transmitting unit 3 be attached to the outer side surface which is not the inner side surface of the valve yoke 9 (the surface on which a semiconductor substrate 2 is installed) from the viewpoint of the radio wave travel distance.

Moreover, when mounting a semiconductor substrate 2 to the valve yoke 9, if the installation is executed in a way other than the ways mentioned above, performance may be somewhat reduced, but the same advantages can be expected.

Figure 21:
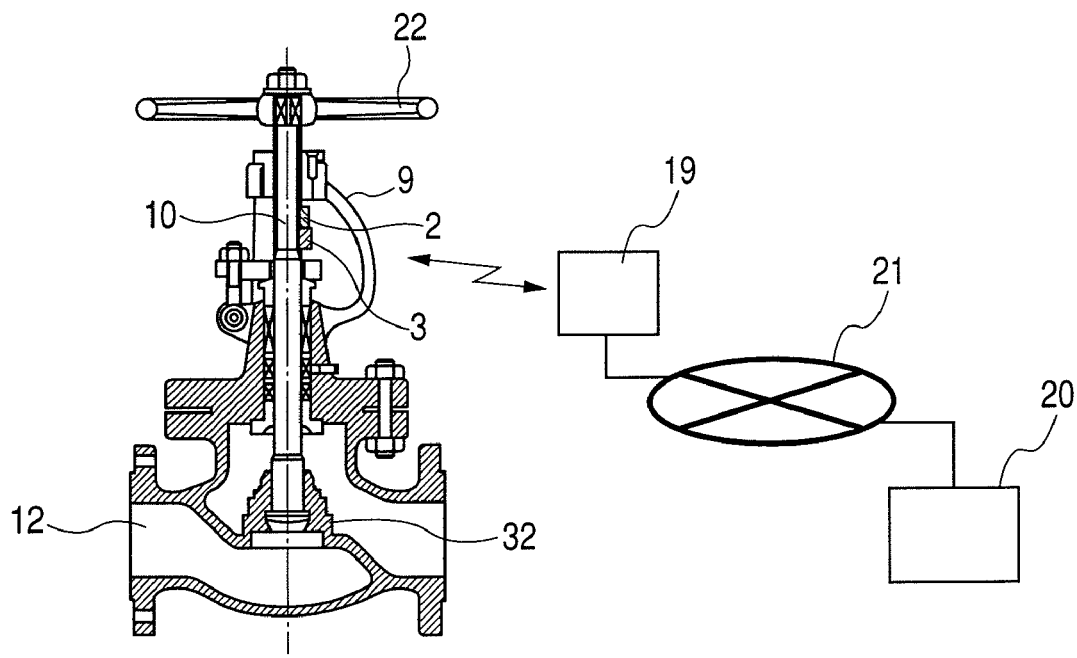
FIG. 21 is another schematic illustration of a monitoring system for valve device of a fifth embodiment of the present invention.
Figure 22:
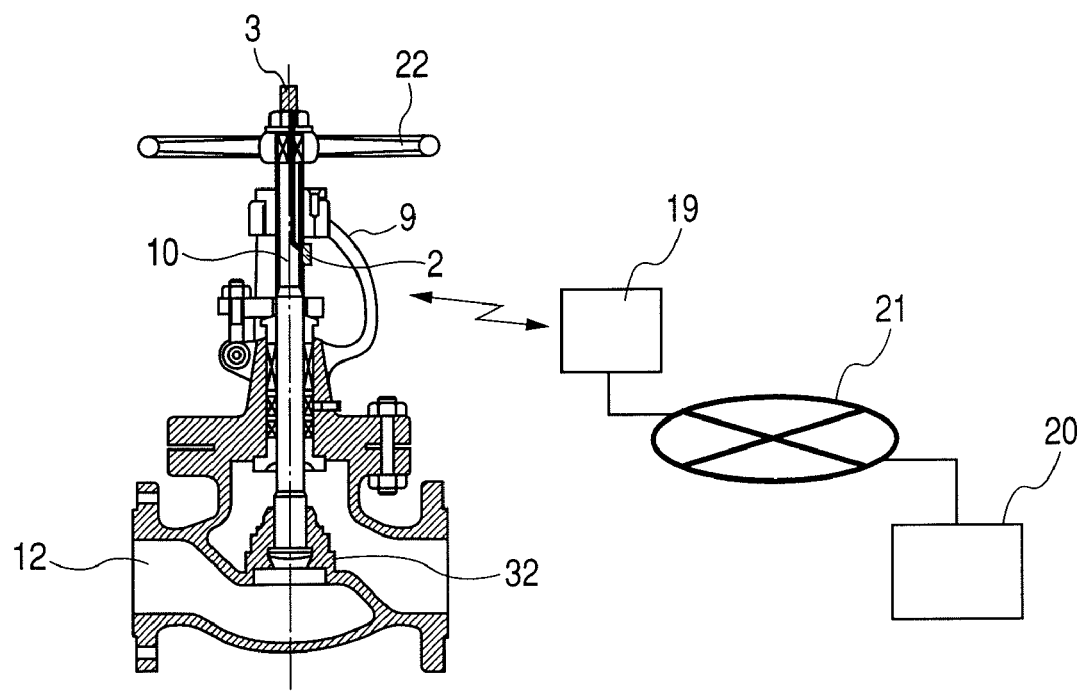
FIG. 22 is another schematic illustration of a monitoring system for valve device of a fifth embodiment of the present invention.

FIG. 21 is another schematic illustration of a monitoring system for valve device of a fifth embodiment of the present invention; and FIG. 22 is another schematic illustration of a monitoring system for valve device of a fifth embodiment of the present invention. As shown in FIG. 21, the substrate can be installed on the valve stem 10. The installation position and direction of the semiconductor substrate 2 can be one of those shown in FIGS. 8, 9, 10 and 30.

In that case, the same advantages as expected from an embodiment shown in FIG. 20 can be obtained, and also advantages shown in a second embodiment can be expected. Specifically, manual valves are small in many cases, and it is difficult to mount a conventional strain detection system to such a valve. Because the semiconductor substrate 2 and the controlling and transmitting unit 3 used in the present invention are very small, they can be installed on a small valve device with a size of several centimeters. Furthermore, as shown in FIG. 22, the controlling and transmitting unit 3 can be mounted in the vicinity of a handle 22. By doing so, there are advantages that the radio wave travel distance increases and that a battery can be easily replaced.

Sixth Embodiment

Figure 23:
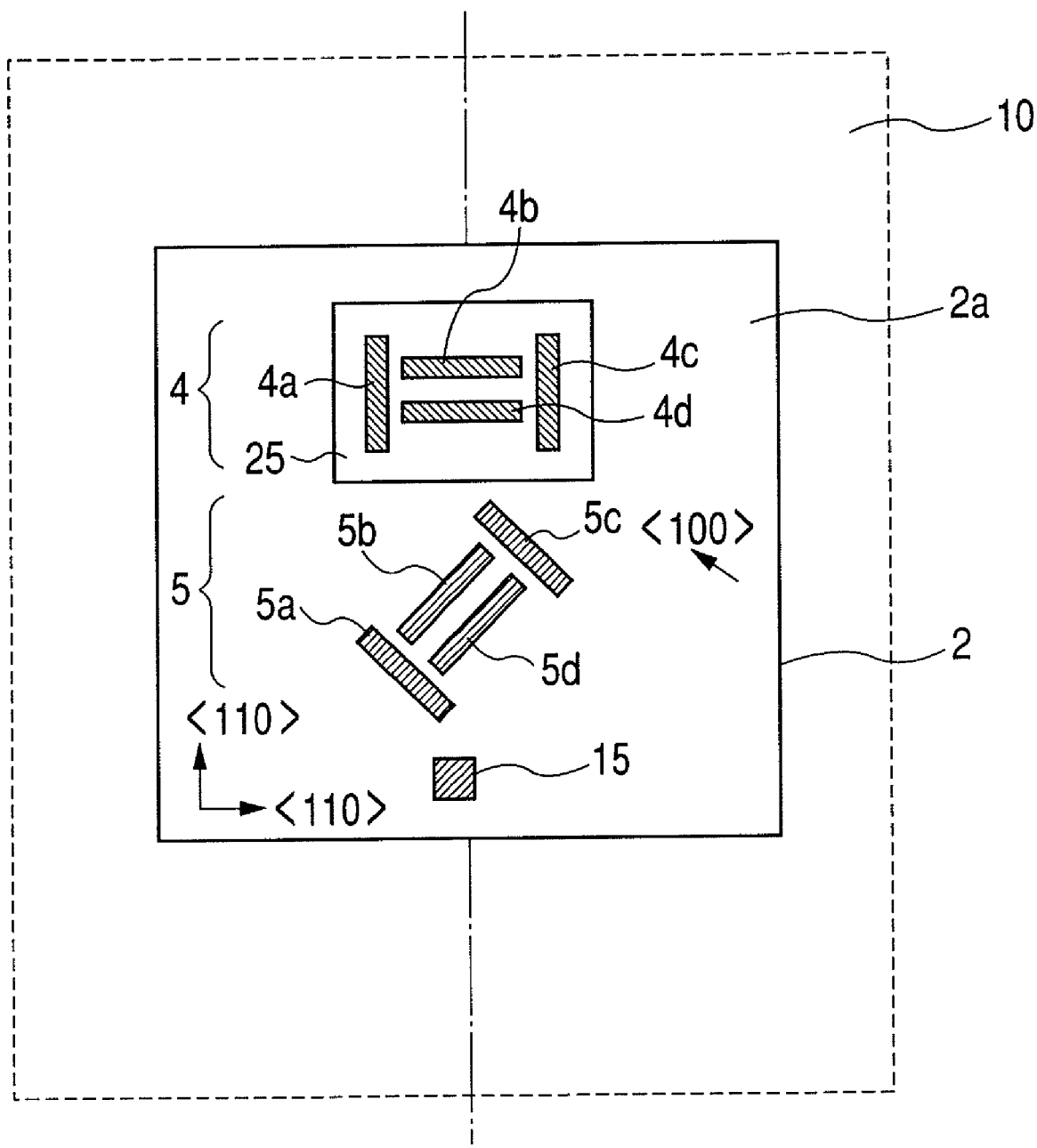
FIG. 23 is a schematic illustration of a semiconductor substrate with a built-in temperature sensor in a sixth embodiment of the present invention.

FIG. 23 is a schematic illustration of a semiconductor substrate with a built-in temperature sensor in a sixth embodiment of the present invention. A sixth embodiment according to the present invention will be described with reference to FIG. 23. This embodiment is an example in which a semiconductor substrate 2 has a built-in temperature sensor 15. A semiconductor substrate 2 is made of semiconductor material, such as silicon, and in most cases, material being measured for strain is steel. For this reason, when the temperature changes, thermal strain due to a difference of thermal expansion coefficient is generated between the semiconductor substrate 2 and the material to be measured. Although this thermal strain is relatively small in comparison with the temperature dependence of the piezoresistive effect, this thermal strain should be considered when accurate measurement is necessary. As shown in FIG. 23, by providing a temperature sensor 15 inside a semiconductor substrate 2, it is possible to correct thermal strain in the controlling and transmitting unit 3 or in the remote monitoring center 20 by using the temperature data; and accurate measurement is possible even when the temperature changes. Since the semiconductor single crystalline substrate 2 has a high thermal conductivity, it is considered that the temperature sensor 15 has almost the same temperature as that of each bridged circuit. Therefore, it is possible to accurately compensate the thermal strain. Furthermore, according to this embodiment, it is possible to detect the temperature condition of the valve device as well as strain condition of the valve device; therefore, it is possible to detect some kind of abnormality of the plant from the temperature change. Furthermore, the temperature sensor 15 comprises impurity-diffused layers, especially a junction of p-type and n-type impurity-diffused layers, formation of the temperature sensor 15 can share the process with a bridged circuit in the semiconductor substrate 2.

Seventh Embodiment

As shown in first to sixth embodiments, a monitoring system according to the present invention can achieve both highly accurate measurements and low power consumption. Because of low power consumption, it is possible to intermittently obtain strain data at short time intervals. By storing such precisely obtained data as history, there is an advantage in that cause of a malfunction of the valve device can be quickly isolated in case of an accident. Furthermore, because of wireless communication, it is easy to attach a wireless device with an internal power supply, such as a battery, and a sensor to a rotating body, such as a valve stem; and the number of external wires can be extremely reduced. As a result, the maintenance ability of the valve device will be significantly improved.

On the other hand, if wireless transmission is periodically conducted only by an internal power supply, such as a battery, there will be a problem in that the use of the device for a period longer than ten years becomes difficult due to the exhaustion of the battery. Accordingly, this seventh embodiment solves that problem. A seventh embodiment of the present invention will be described below with reference to FIGS. 24 to 28.

Figure 24:
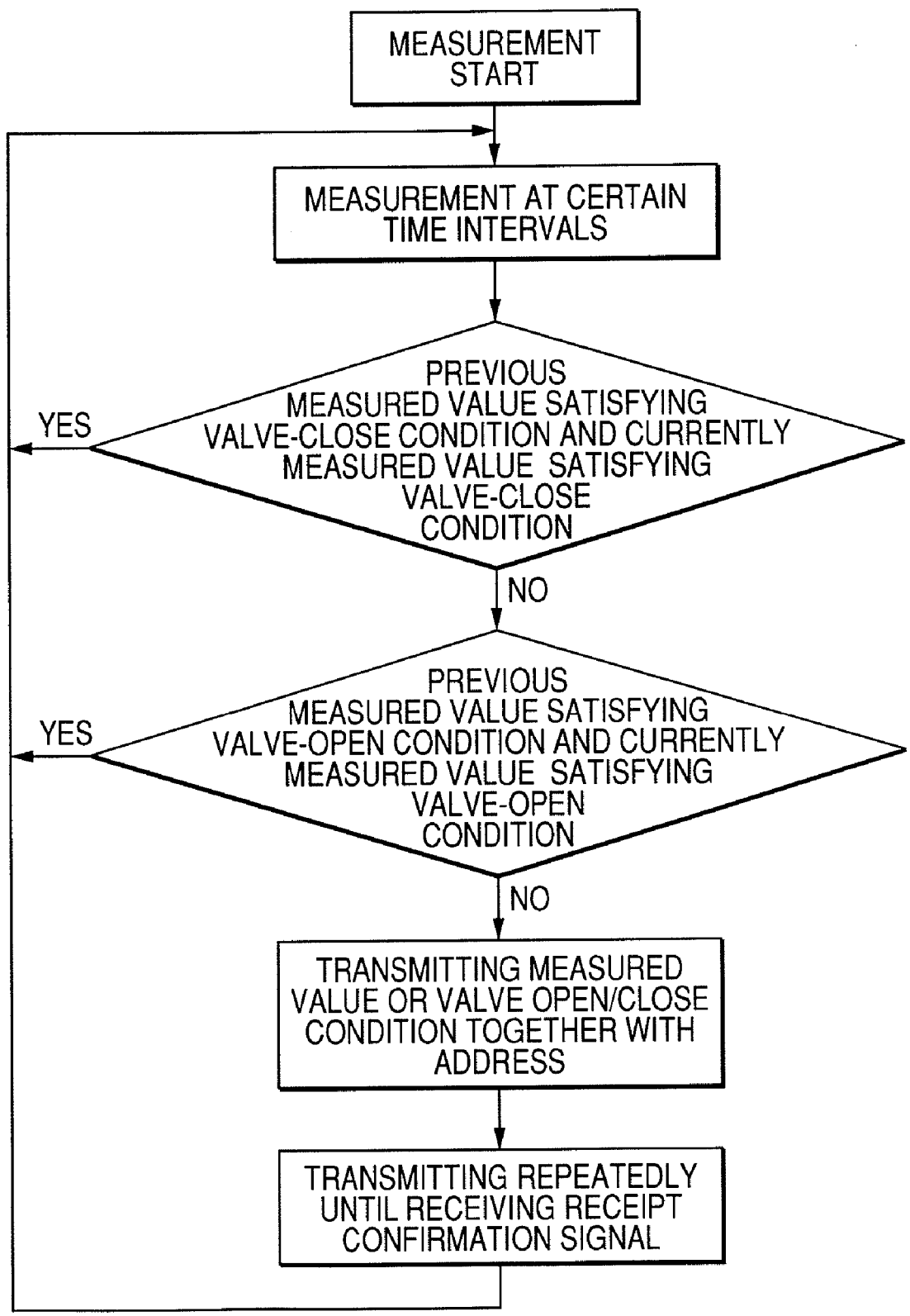
FIG. 24 shows an operation flow of the controlling and transmitting unit in a monitoring system for valve device in a seventh embodiment of the present invention.

FIG. 24 shows an operation flow of the controlling and transmitting unit in a monitoring system for valve device in a seventh embodiment of the present invention. As shown in FIG. 24, in this embodiment, the controlling and transmitting unit 3 intermittently measures thrust and torque of the valve device. If condition has changed when compared to the latest measured value with the previous measured value, the controlling and transmitting unit 3 sends the measurement result to the remote monitoring center 20. For example, when the previous measured value satisfies a specific value for the valve close condition, and the latest measured value satisfies the specific value for the same condition, the measurement result is not sent; however, when the latest measured value does not satisfy the specific value for the valve close condition, the data is transmitted. In the same manner, when the previous measured value satisfies a specific value for the valve open condition, if the latest measured value does not satisfy the specific value for the valve open condition, the data is transmitted. Furthermore, it is possible to configure an additional prescribed value that shows the condition other than the valve open condition and the valve close condition. For example, a prescribed value which does not indicate either a valve open nor close condition is set between the specific value for the valve close condition and the specific value for the valve open condition; and when the latest measured value is not a specific value for the valve close condition, nor is a specific value for the valve open condition, data is transmitted. By applying this method, data is transmitted only when the condition changes. Therefore, it is possible to save electric power required for data transmission, thereby making it possible to save electric power of an internal power supply. Furthermore, by detecting a condition other than the valve open and close conditions, it is possible to reliably detect the condition even when the valve device's sealing force is not sufficient. Furthermore, enormous quantities of valve devices exist in an actual plant, and lots of controlling and transmitting units 3 are installed; therefore, it is considered that interference with communication may occur. As shown in this embodiment, by executing communication only when the valve device's open or close conditions change, it is possible to reduce the probability of the occurrence of communication interference. By doing so, it is possible to reliably and quickly monitor valve device conditions without a delay in data transmission.

The controlling and transmitting unit 3 sends a measured value together with the address, which is a numerical value unique to the controlling and transmitting unit 3, to the remote monitoring center 20. At that time, the measured value can be processed and sent. When an IP conversion module 19, which is a recipient of a radio wave, receives data from the controlling and transmitting unit 3, it returns a signal to the controlling and transmitting unit 3 to confirm the receipt of data. The controlling and transmitting unit 3 repetitively sends data wirelessly until it receives the receipt confirmation signal. This communication may be either continuous communication or intermittent communication. By confirming the receipt of data in such a manner, the condition of the valve device can be reliably monitored. Furthermore, in this embodiment, data is transmitted only when a condition has been changed; therefore, the amount of communication conducted by an entire system is reduced, resulting in reducing the possibility of interference. Accordingly, because precise data can be reliably sent and received within a few times of communication even if receipt of data is confirmed, there is an advantage in that electric power required for data communication is minimized. In other words, according to this embodiment, it is possible to reliably monitor the condition of the valve device with low power consumption.

As described above, in this embodiment, values of strain caused when the valve device is normally opened and closed have been stored in advance in the controlling and transmitting unit 3, and a measured value is compared to the stored values. Then only when the condition changes, wireless communication is executed. In addition, it is also possible to store no specific strain values for normal valve operation and to execute wireless communication only when the amount of change of the measured value increases larger than a prescribed value. That is, when the amount of strain is largely changed, it is judged that some kind of condition change has occurred at the valve device, and the measured value can be wirelessly transmitted. This process has an advantage in that changes can be reliably recognized even when the amount of offset of the sensor has increased due to deterioration over time.

Figure 25:
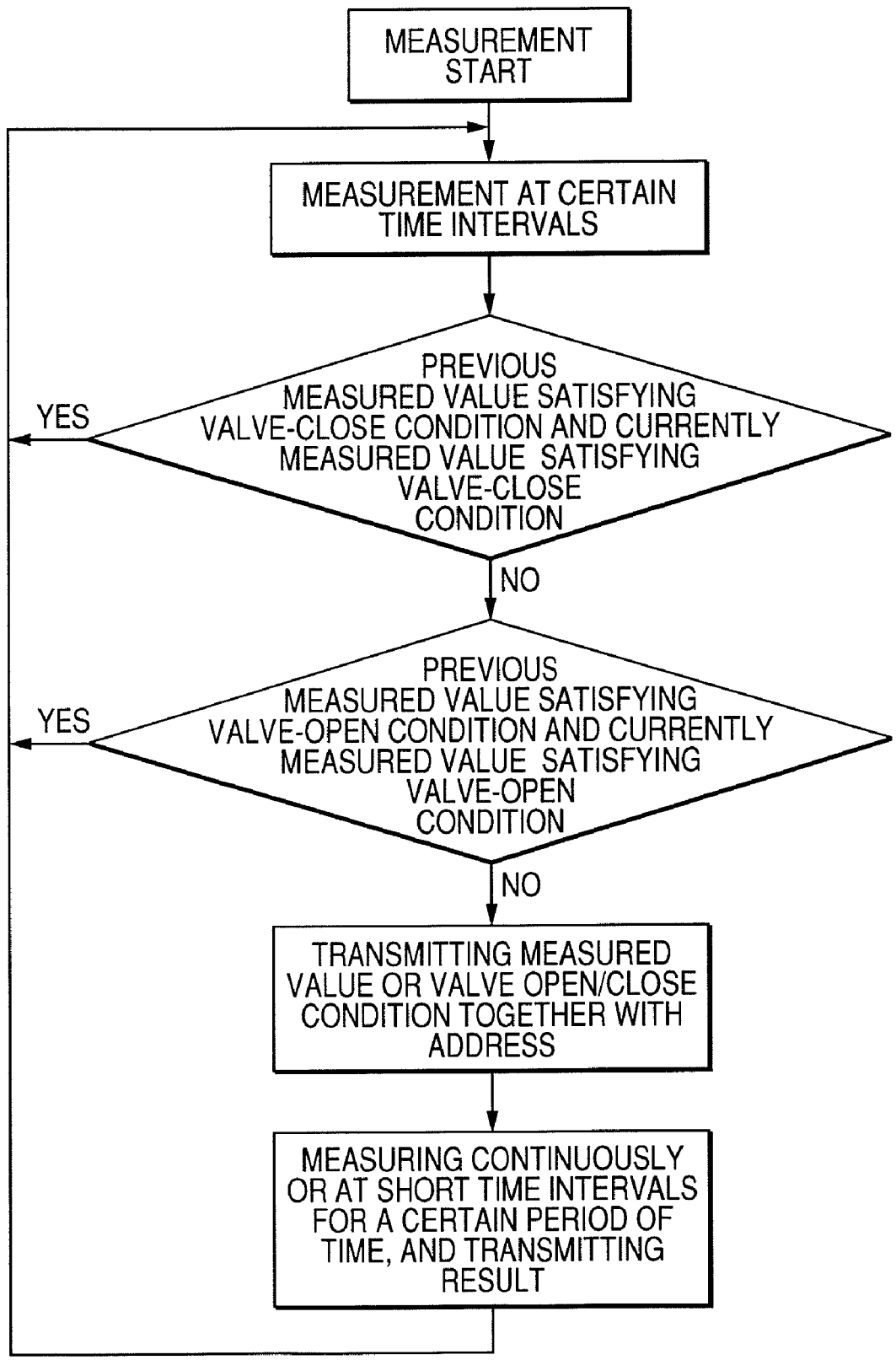
FIG. 25 shows another operation flow of the controlling and transmitting unit in a monitoring system for valve device in a seventh embodiment of the present invention.

FIG. 25 shows another operation flow of the controlling and transmitting unit in a monitoring system for valve device in a seventh embodiment of the present invention. As shown in FIG. 25, when a change of the valve device condition is detected, it is possible that the condition data are sent and also measurement continues for a certain period of time and that the results are continuously sent to the remote monitoring center 20. By doing so, it is possible to continuously measure the condition of strain while the valve is opening or closing. As a result, it is possible to continuously measure torque caused by sliding friction while the valve is in operation, thereby enabling to diagnose deterioration and predict a malfunction. For example, in case of a malfunction, such as when a foreign object becomes adhered to a portion of the valve stem 10, a phenomenon is observed in which torque increases while the screw thread portion passes through, thereby making it possible to detect the premonitor of a malfunction to occur. Furthermore, in the cases when the valve device condition is intermittently sent, when a change of the valve device condition is detected or an amount of change of the measured value is larger than a predetermined value, it is possible to make the time interval of intermittent transmissions shorter than that in the situations where changes are not detected or an amount of change of the measured value is smaller than a predetermined value.

Figure 26:
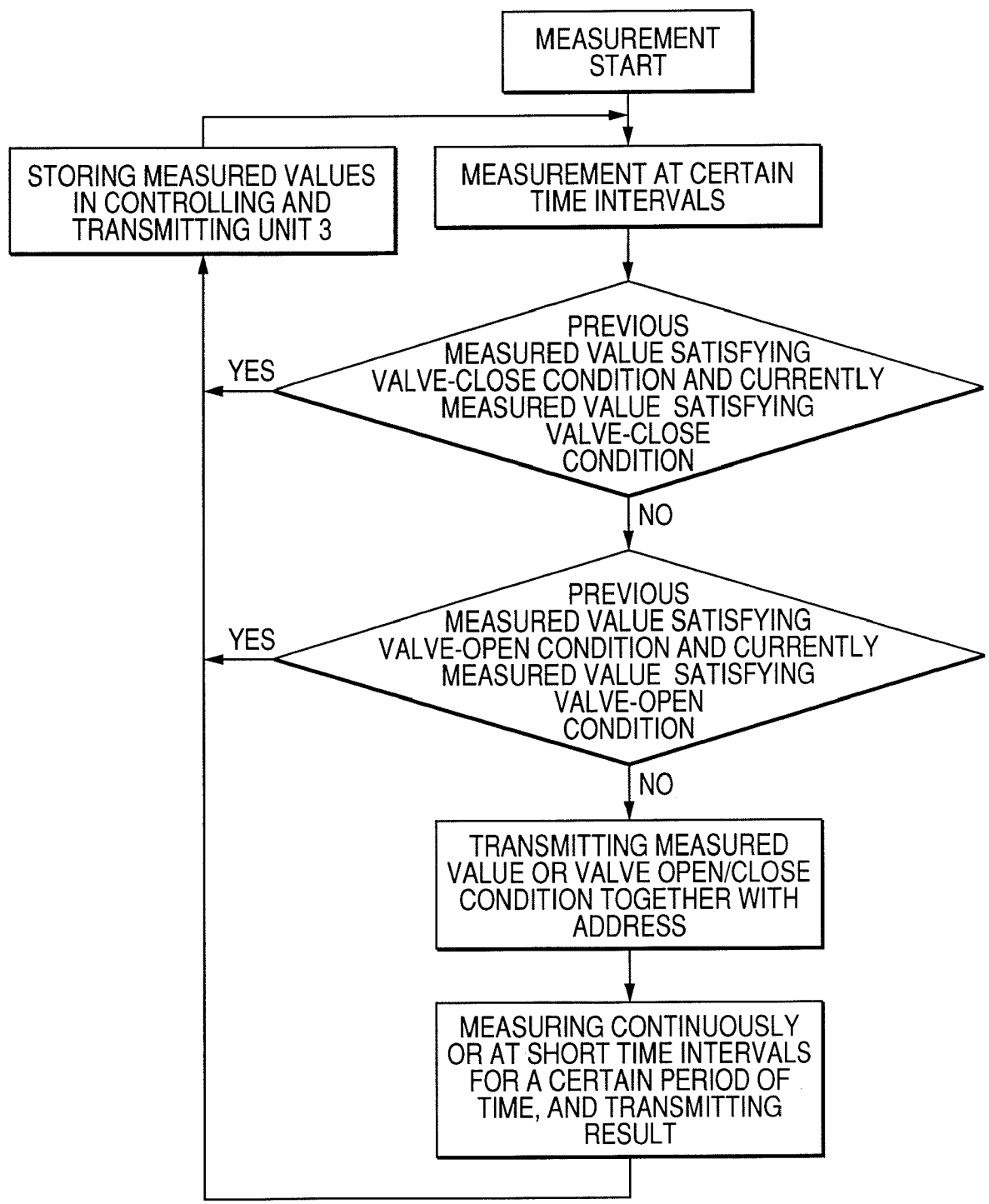
FIG. 26 shows another operation flow of the controlling and transmitting unit in a monitoring system for valve device in a seventh embodiment of the present invention.

FIG. 26 shows another operation flow of the controlling and transmitting unit in a monitoring system for valve device in a seventh embodiment of the present invention. As shown in FIG. 26, it is possible to provide a storage device (not shown) in the controlling and transmitting unit 3 to store measured values in the controlling and transmitting unit 3. It is desirable that the storage device be a nonvolatile memory such as a flash memory. Furthermore, it is possible to process measured values and store the data. By doing so, when a malfunction occurs in a valve device, by referring to the stored measurement data, investigation of the malfunction becomes easy. Besides, since the storage device in the controlling and transmitting unit 3 has a limitation in its storage capacity, old data may be overwritten one by one after a certain period of time passed or the storage becomes full.

Figure 27:
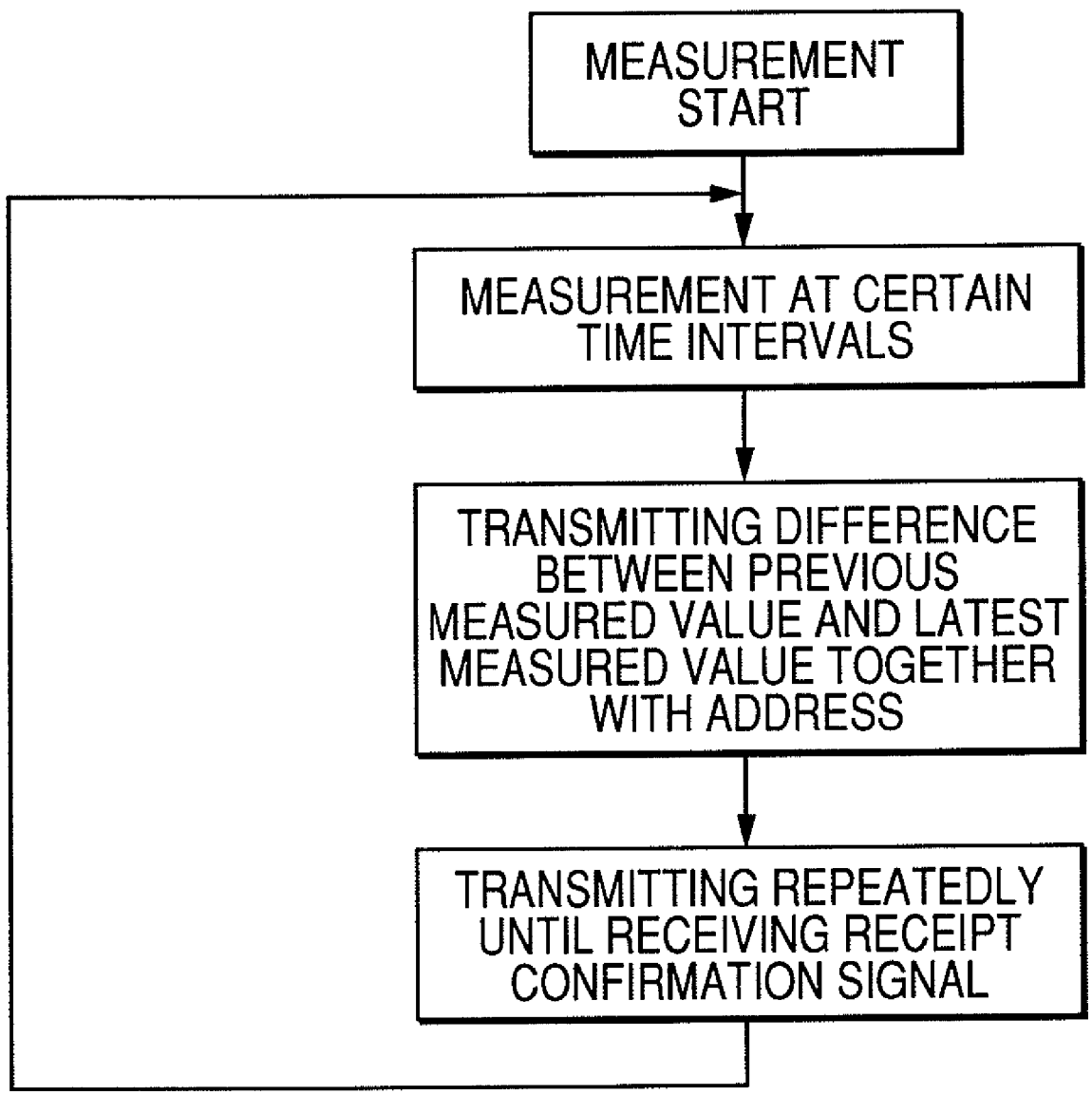
FIG. 27 shows another operation flow of the controlling and transmitting unit in a monitoring system for valve device in a seventh embodiment of the present invention.

FIG. 27 shows another operation flow of the controlling and transmitting unit in a monitoring system for valve device in a seventh embodiment of the present invention.

Depending on purpose of use, it may be necessary to send all measurement data from the controlling and transmitting unit 3 to the remote monitoring center 20. In this case, as shown in FIG. 27, it is desirable that the difference between the previous measured value and the latest measured value be sent. By doing so, the digit sequence to be transmitted is short thereby reducing the transmission time; consequently, it is possible to reduce the consumption of electric power.

Figure 28:
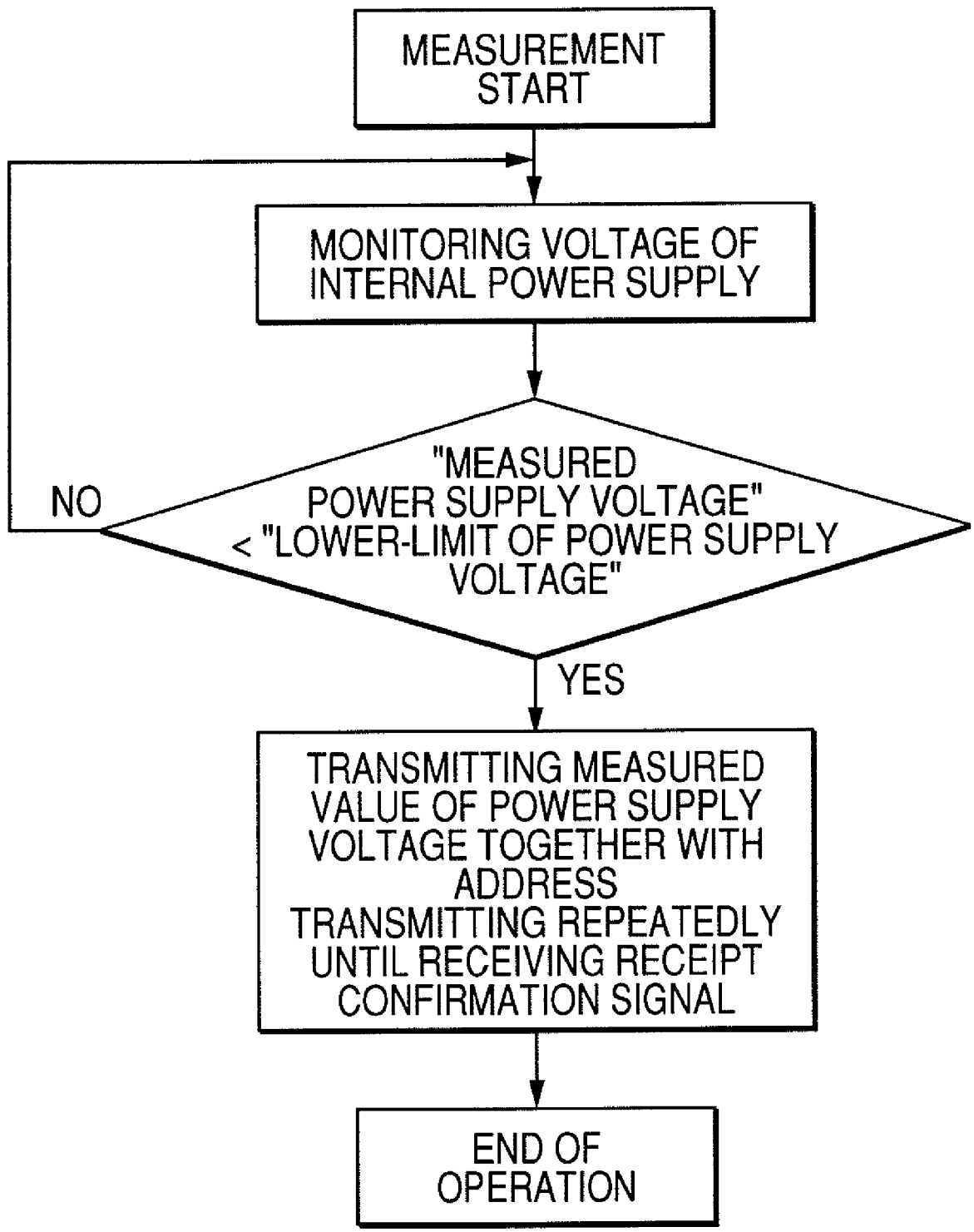
FIG. 28 shows another operation flow of the controlling and transmitting unit in a monitoring system for valve device in a seventh embodiment of the present invention.

FIG. 28 shows another operation flow of the controlling and transmitting unit in a monitoring system for valve device in a seventh embodiment of the present invention. As shown in FIG. 28, it is recommended that voltage of an internal power supply be monitored simultaneously with measurement. For example, the controlling and transmitting unit 3 measures voltage of the internal power supply and compares the value with the predetermined lower limit voltage of the power supply; and when the measured value is lower than the predetermined value, a power supply voltage value (amount of remaining power supply) or a warning signal that indicates power supply shortage is wirelessly sent to the remote monitoring center 20 together with the address of the controlling and transmitting unit 3. According to this embodiment, even when a battery is used as an internal power supply, the battery can be replaced before it becomes exhausted, thereby enabling reliable measurement. Specifically in a system as shown in FIG. 24 in which communication is executed only when the condition changes, if a monitoring mechanism shown in FIG. 28 is not provided, it is not recognized from outside whether the battery is exhausted or the condition does not change; consequently, the system's reliability decreases. In a system that functions as shown in FIG. 28, it is clear whether the battery is exhausted or the condition does not change; accordingly, the condition can be reliably monitored with low power consumption.

Eighth Embodiment

Figure 29:
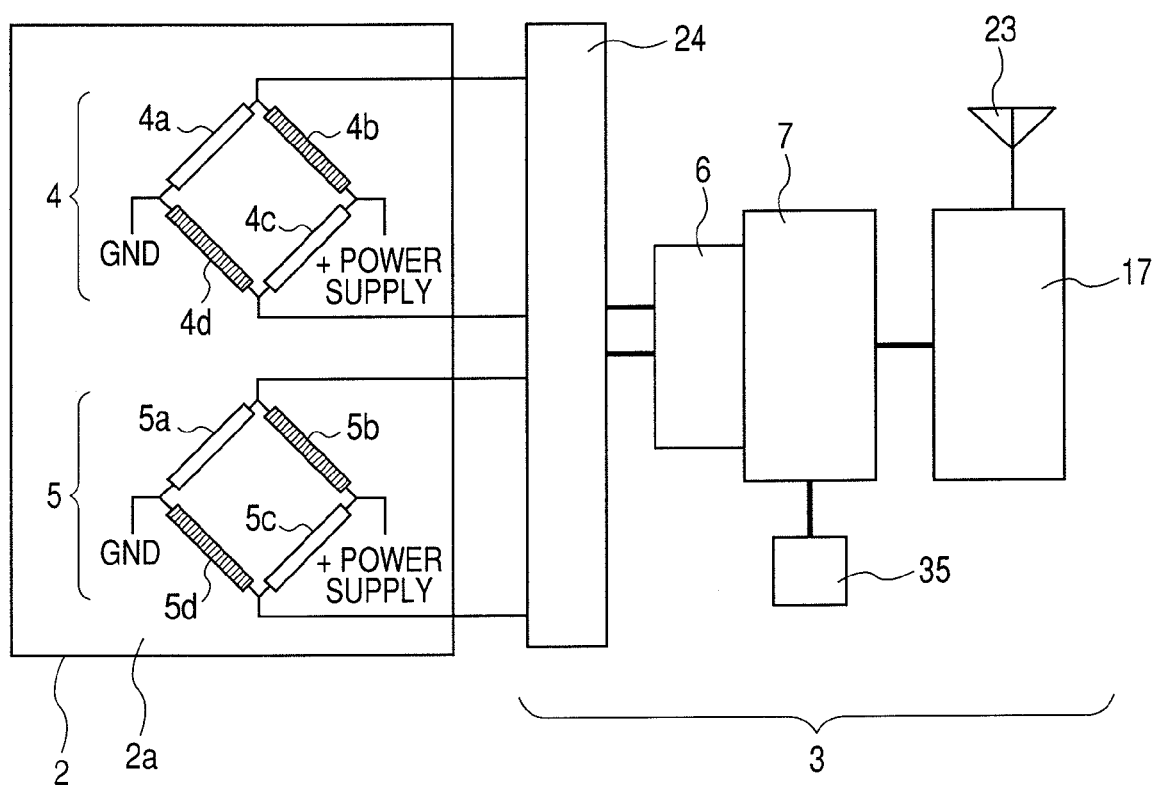
FIG. 29 is a block diagram showing the connections of an electric circuit in an eighth embodiment of the present invention.

FIG. 29 is a block diagram showing the connections of an electric circuit in an eighth embodiment of the present invention. In this embodiment, a luminary device 35 is provided in the controlling and transmitting unit 3. It is recommended that a luminary device 35 be that with low power consumption, such as an LED (light emitting diode). The luminary device 35 is turned on and off according to whether the valve device is opened or closed. For example, the controlling and processing device 7 compares the latest measured value with the predetermined value for strain in the open or close condition of the valve device; and based on that, it is determined whether the luminary device 35 is turned on or off. Specifically, it is preferable that the luminary device 35 is turned on when the condition does not satisfy either the valve open condition or the valve close condition. When the light is turned on, e.g., it is indicated that the close condition of the valve device has a problem. Therefore, security staff can visually find abnormality during inspection without needing indication from the remote monitoring center; consequently, it is possible to quickly cope with abnormality of the valve device. Furthermore, in a large-scale plant in which an enormous number of valve devices are installed, it is not easy to detect a problematic valve device among many valve devices even when the remote monitoring center 20 detects abnormality and security staff repairs it. According to this embodiment, however, because only a luminary device 35 of a valve device that has abnormality is turned on, it is easy to find the valve device with a problem, which has an advantage in that an error, such as a wrong repair to a non-troubled valve device, can be prevented. Furthermore, by turning on only an LED of the valve device with abnormality, it is possible to prevent an internal power supply from wearing out when the valve device is in normal operation. As a result, long-term operation of the valve device can be possible.

Furthermore, it is also possible to turn on the LED only when the valve device is opened or closed. In that case, because security staff can visually check the condition of the valve, it is possible to quickly inspect the valve's open or close condition. Conventionally, it took much time for security staff to turn the handle of the valve and check the tightness by hand. However, this embodiment enables the condition to be visually checked, resulting in quick inspection.

Moreover, in this embodiment, a luminary device is used as a device to alert security staff; however, an alarm device that signals an alarm via the screen or with sound can be used, or a luminary device can be built in the controlling and transmitting unit 3 or externally connected.

Ninth Embodiment

In the same manner as shown in FIG. 29, this embodiment is an example in which a luminary device 35 is provided in the controlling and transmitting unit 3, and the luminary device can be remotely turned on/off from a remote monitoring center 20. That is, wireless communication is conducted from the remote monitoring center 20 to the controlling and transmitting unit 3 via an IP conversion module; and then the luminary device 35 disposed in the controlling and transmitting unit 3 is turned on or off. The wirelessly communicated data includes the address of a specific controlling and transmitting unit 3 and the command for turning on or off the luminary device 35. When security staff repairs or inspects a specific valve device, by detecting a controlling and transmitting unit 3 with its LED turned on, it is possible to reliably find a problematic valve device even when an enormous number of valve devices are provided. According to this embodiment, it is possible to provide a valve device that can be reliably and effectively inspected. Moreover, this embodiment is also very effective for inspecting a valve device from a viewpoint of the efficient maintenance inspection and elimination of human errors even if a monitoring system has no strain measuring function.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A monitoring system for a valve device, comprising:
a semiconductor single crystalline substrate including a bridged circuit, the bridged circuit comprising impurity-diffused resistors, wherein:
the impurity-diffused resistors are p-type impurity-diffused resistors having a longitudinal direction located in a <110> direction of the semiconductor single crystalline substrate; and
the semiconductor single crystalline substrate is mounted to a portion of the valve device such that the <110> direction of the semiconductor single crystalline substrate is located in an axial direction of a valve stem or a drive shaft of the valve device.

2. A monitoring system for a valve device, comprising:
a semiconductor single crystalline substrate including a bridged circuit, and the bridged circuit comprising impurity-diffused resistors, wherein:
the impurity-diffused resistors are n-type impurity-diffused resistors having a longitudinal direction located in a <100> direction of the semiconductor single crystalline substrate; and the semiconductor single crystalline substrate is mounted to a portion of the valve device such that the <100> direction of the semiconductor single crystalline substrate is located in an axial direction of a valve stem or a drive shaft of the valve device.

3. A monitoring system for a valve device, comprising:
a semiconductor single crystalline substrate including a bridged circuit, the bridged circuit comprising impurity-diffused resistors, wherein:
the semiconductor single crystalline substrate is mounted to a portion of the valve device; and
the semiconductor single crystalline substrate includes a first bridged circuit comprising p-type impurity-diffused resistors and a second bridged circuit comprising n-type impurity-diffused resistors.

4. The monitoring system for a valve device according to claim 3, wherein:
longitudinal directions of the p-type impurity-diffused resistors are located in a <110> direction of the semiconductor single crystalline substrate; and
longitudinal directions of the n-type impurity-diffused resistors are located in a <100> direction of the semiconductor single crystalline substrate.

5. The monitoring system for a valve device according to claim 1, wherein:
the portion of the valve device is any of the valve device's valve stem, drive shaft, valve yoke, or elastic body disposed at an end of the drive shaft.

6. The monitoring system for a valve device according to claim 2, wherein:
the portion of the valve device is any of the valve device's valve stem, drive shaft, valve yoke, or elastic body disposed at an end of the drive shaft.

7. The monitoring system for a valve device according to claim 3, wherein:
the portion of the valve device is any of the valve device's valve stem, drive shaft, valve yoke, or elastic body disposed at an end of the drive shaft.

8. The monitoring system for a valve device according to claim 1, wherein:
the semiconductor single crystalline substrate further includes a temperature sensor.

9. The monitoring system for a valve device according to claim 2, wherein:
the semiconductor single crystalline substrate further includes a temperature sensor.

10. The monitoring system for a valve device according to claim 3, wherein:
the semiconductor single crystalline substrate further includes a temperature sensor.

11. The monitoring system for a valve device according to claim 1, wherein:
the semiconductor single crystalline substrate is disposed inside the valve stem.

12. The monitoring system for a valve device according to claim 2, wherein:
the semiconductor single crystalline substrate is disposed inside the valve stem.

13. The monitoring system for a valve device according to claim 3, wherein:
the semiconductor single crystalline substrate is disposed inside valve stem of the valve device.

14. The monitoring system for a valve device according to claim 1, wherein:
a planar portion is provided on a side face of the valve stem; and the semiconductor single crystalline substrate is disposed on the planar portion.

15. The monitoring system for a valve device according to claim 2, wherein:
a planar portion is provided on a side face of the valve stem; and the semiconductor single crystalline substrate is disposed on the planar portion.

16. The monitoring system for a valve device according to claim 3, wherein:
a planar portion is provided on a side face of a valve stem of the valve device; and the semiconductor single crystalline substrate is disposed on the planar portion.

17. The monitoring system for a valve device according to claim 1, wherein:
the semiconductor single crystalline substrate is disposed on a side face of the valve stem; and the valve stem is hollow in the vicinity of an area where the semiconductor single crystalline substrate is disposed.

18. The monitoring system for a valve device according to claim 2, wherein:
the semiconductor single crystalline substrate is disposed on a side face of the valve stem; and the valve stem is hollow in the vicinity of an area where the semiconductor single crystalline substrate is disposed.

19. The monitoring system for a valve device according to claim 3, wherein:
the semiconductor single crystalline substrate is disposed on a side face of a valve stem of the valve device; and the valve stem is hollow in the vicinity of an area where the semiconductor single crystalline substrate is disposed.

20. The monitoring system for a valve device according to claim 1, wherein:
the valve device is a manual valve device.

21. The monitoring system for a valve device according to claim 2, wherein:
the valve device is a manual valve device.

22. The monitoring system for a valve device according to claim 3, wherein:
the valve device is a manual valve device.

23. The monitoring system for a valve device according to claim 1, wherein:
the monitoring system further comprises a controlling and transmitting unit; the controlling and transmitting unit is mounted to a portion of the valve device; and
the semiconductor single crystalline substrate and the controlling and transmitting unit detect an open or closed condition of the valve device and transmit data of the condition.

24. The monitoring system for a valve device according to claim 2, wherein:
the monitoring system further comprises a controlling and transmitting unit; the controlling and transmitting unit is mounted to a portion of the valve device; and
the semiconductor single crystalline substrate and the controlling and transmitting unit detect an open or closed condition of the valve device and transmit data of the condition.

25. The monitoring system for a valve device according to claim 3, wherein:
the monitoring system further comprises a controlling and transmitting unit; the controlling and transmitting unit is mounted to a portion of the valve device; and
the semiconductor single crystalline substrate and the controlling and transmitting unit detect an open or closed condition of the valve device and transmit data of the condition.

26. The monitoring system for a valve device according to claim 23, wherein:

transmission from the transmitting unit is wireless transmission.

27. The monitoring system for a valve device according to claim 24, wherein:
transmission from the transmitting unit is wireless transmission.

28. The monitoring system for a valve device according to claim 25, wherein:
transmission from the transmitting unit is wireless transmission.

29. The monitoring system for a valve device according to claim 26, wherein:
the semiconductor single crystalline substrate and the controlling and transmitting unit are configured to be used to detect the open or closed condition of the valve device; and
the wireless transmission is conducted when the open or closed condition of the valve device changes.

30. The monitoring system for a valve device according to claim 27, wherein:
the semiconductor single crystalline substrate and the controlling and transmitting unit are configured to be used to detect the open or closed condition of the valve device; and
the wireless transmission is conducted when the open or closed condition of the valve device changes.

31. The monitoring system for a valve device according to claim 28, wherein:
the semiconductor single crystalline substrate and the controlling and transmitting unit are configured to be used to detect the open or closed condition of the valve device; and
the wireless transmission is conducted when the open or closed condition of the valve device changes.

32. The monitoring system for a valve device according to claim 26, wherein:
the semiconductor single crystalline substrate and the controlling and transmitting unit are configured to be used to measure thrust and torque of the valve device; and
the wireless transmission is executed when an amount of change of the measured value is larger than a prescribed value.

33. The monitoring system for a valve device according to claim 27, wherein:
the semiconductor single crystalline substrate and the controlling and transmitting unit are configured to be used to measure thrust and torque of the valve device; and
the wireless transmission is executed when an amount of change of the measured value is larger than a prescribed value.

34. The monitoring system for a valve device according to claim 28, wherein:
the semiconductor single crystalline substrate and the controlling and transmitting unit are configured to be used to measure thrust and torque of the valve device; and
the wireless transmission is executed when an amount of change of the measured value is larger than a prescribed value.

35. The monitoring system for a valve device according to claim 26, wherein:
the open or closed condition of the valve device is transmitted to receiving equipment, and the transmission is executed continuously or intermittently until a receipt confirmation signal sent from the receiving equipment is received.

36. The monitoring system for a valve device according to claim 27, wherein:
the open or closed condition of the valve device is transmitted to receiving equipment, and the transmission is executed continuously or intermittently until a receipt confirmation signal sent from the receiving equipment is received.

37. The monitoring system for a valve device according to claim 28, wherein:
the open or closed condition of the valve device is transmitted to receiving equipment, and the transmission is executed continuously or intermittently until a receipt confirmation signal sent from the receiving equipment is received.

38. The monitoring system for a valve device according to claim 26, wherein:
the semiconductor single crystalline substrate and the controlling and transmitting unit are configured to be used to detect the open or closed condition of the valve device and execute intermittent transmission; and
when the open or closed condition changes, intermittent transmission is executed at shorter time intervals than those executed when the open or closed condition does not change, or continuous transmission is executed.

39. The monitoring system for a valve device according to claim 27, wherein:
the semiconductor single crystalline substrate and the controlling and transmitting unit are configured to be used to detect the open or closed condition of the valve device and execute intermittent transmission; and
when the open or closed condition changes, intermittent transmission is executed at shorter time intervals than those executed when the open or closed condition does not change, or continuous transmission is executed.

40. The monitoring system for a valve device according to claim 28, wherein:
the semiconductor single crystalline substrate and the controlling and transmitting unit are configured to be used to detect the open or closed condition of the valve device and execute intermittent transmission; and
when the open or closed condition changes, intermittent transmission is executed at shorter time intervals than those executed when the open or closed condition does not change, or continuous transmission is executed.

41. The monitoring system for a valve device according to claim 26, wherein:
the semiconductor single crystalline substrate and the controlling and transmitting unit are configured to be used to detect the open or closed condition of the valve device and execute intermittent transmission; and
when the open or closed condition changes, intermittent transmission is executed at shorter time intervals than those executed when the open or closed condition does not change, or continuous transmission is executed.

42. The monitoring system for a valve device according to claim 27, wherein:
the semiconductor single crystalline substrate and the controlling and transmitting unit are configured to be used to measure thrust and torque of the valve device and to execute intermittent transmission; and
when an amount of change of the measured value is larger than a prescribed value, intermittent transmission is executed at shorter time intervals than those executed when an amount of change of the measured value is smaller than a prescribed value, or continuous transmission is executed.

43. The monitoring system for a valve device according to claim 28, wherein:

the semiconductor single crystalline substrate and the controlling and transmitting unit are configured to be used to measure thrust and torque of the valve device and to execute intermittent transmission; and when an amount of change of the measured value is larger than a prescribed value, intermittent transmission is executed at shorter time intervals than those executed when an amount of change of the measured value is smaller than a prescribed value, or continuous transmission is executed.

44. The monitoring system for a valve device according to claim 26, wherein:
the monitoring system further comprises a storage device to store data measured or processed by the semiconductor single crystalline substrate and the controlling and transmitting unit.

45. The monitoring system for a valve device according to claim 27, wherein:
the monitoring system further comprises a storage device to store data measured or processed by the semiconductor single crystalline substrate and the controlling and transmitting unit.

46. The monitoring system for a valve device according to claim 28, wherein:
the monitoring system further comprises a storage device to store data measured or processed by the semiconductor single crystalline substrate and the controlling and transmitting unit.

47. The monitoring system for a valve device according to claim 26, wherein:
an amount of change of a measured value or processed measured data is transmitted.

48. The monitoring system for a valve device according to claim 27, wherein:
an amount of change of a measured value or processed measured data is transmitted.

49. The monitoring system for a valve device according to claim 28, wherein:
an amount of change of a measured value or processed measured data is transmitted.

50. The monitoring system for a valve device according to claim 26, wherein:
the monitoring system further comprises an internal power supply in the controlling and transmitting unit; and
the controlling and transmitting unit transmits a numerical value indicating a remaining amount of the internal power supply.

51. The monitoring system for a valve device according to claim 27, wherein:
the monitoring system further comprises an internal power supply in the controlling and transmitting unit; and
the controlling and transmitting unit transmits a numerical value indicating a remaining amount of the internal power supply.

52. The monitoring system for a valve device according to claim 28, wherein:
the monitoring system further comprises an internal power supply in the controlling and transmitting unit; and
the controlling and transmitting unit transmits a numerical value indicating a remaining amount of the internal power supply.

53. A monitoring system for a valve device according to claim 1, further comprising:
a controlling and transmitting unit; and
an alarm device built in or connected to the controlling and transmitting unit, wherein:
the semiconductor single crystalline substrate and the controlling and transmitting unit are mounted to a portion of the valve device;
the semiconductor single crystalline substrate and the controlling and transmitting unit are configured to detect an open or closed condition of the valve device and transmit data of the condition; and
the alarm device informs the condition of the valve device.

54. The monitoring system for a valve device according to claim 53, wherein:
the alarm device is comprised of a luminary device disposed in the controlling and transmitting unit.

55. The monitoring system for a valve device according to claim 54, wherein:
the alarm device is operated according to a condition of strain of the valve device measured by the semiconductor single crystalline substrate and the controlling and transmitting unit.

56. The monitoring system for a valve device according to claim 53, wherein:
the open or closed condition of the valve device comprises:
a first condition which indicates that the valve device is open, and
a second condition which indicates that the valve device is closed, and
a third condition which indicates that the valve device is in the condition between the first condition and the second condition; and
the alarm device is operated when the valve device is in the third condition.

57. The monitoring system for a valve device according to claim 26, wherein:
the semiconductor single crystalline substrate and the controlling and transmitting unit are configured to be used to measure thrust and torque of the valve device and to execute intermittent transmission; and
when an amount of change of the measured value is larger than a prescribed value, intermittent transmission is executed at shorter time intervals than those executed when an amount of change of the measured value is smaller than a prescribed value, or continuous transmission is executed.

* * * * *